United States Patent
Oigawa et al.

(10) Patent No.: US 12,069,234 B2
(45) Date of Patent: Aug. 20, 2024

(54) DISTANCE MEASUREMENT DEVICE, MOVING DEVICE, DISTANCE MEASUREMENT METHOD, CONTROL METHOD FOR MOVING DEVICE, AND STORAGE MEDIUM

(71) Applicant: CANON KABUSHIKI KAISHA, Tokyo (JP)

(72) Inventors: Makoto Oigawa, Kanagawa (JP); Shin Tanaka, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 193 days.

(21) Appl. No.: 17/705,062

(22) Filed: Mar. 25, 2022

(65) Prior Publication Data
US 2022/0321871 A1    Oct. 6, 2022

(30) Foreign Application Priority Data

Mar. 30, 2021   (JP) ................ 2021-057085

(51) Int. Cl.
*G06T 7/55*      (2017.01)
*G01S 7/481*    (2006.01)
(Continued)

(52) U.S. Cl.
CPC ......... *H04N 17/002* (2013.01); *G01S 7/4814* (2013.01); *G01S 7/4865* (2013.01);
(Continued)

(58) Field of Classification Search
CPC .... H04N 17/002; H04N 25/61; G01S 7/4814; G01S 7/4865; G01S 17/10; G01S 17/86;
(Continued)

(56) References Cited

U.S. PATENT DOCUMENTS 5,521,633 A * 5/1996 Nakajima ............... G06T 7/246
                                                           348/148
8,390,703 B2 * 3/2013 Iijima ................ G02B 27/123
                                                         348/240.99
(Continued)

FOREIGN PATENT DOCUMENTS

WO    2010/010707 A1    1/2010
WO    2016/042721 A1    3/2016

OTHER PUBLICATIONS

Web page with the definition of Monocular. The American Heritage(R) Dictionary of the English Language © 2016 by Houghton Mifflin Publishing Company at Credo Reference at https://search.credoreference.com/articles/Qm9va0FydGljbGU6NDQzNTI1NA== (Year: 2016).*

(Continued)

*Primary Examiner* — Sath V Perungavoor
*Assistant Examiner* — Paramita Ghosh
(74) *Attorney, Agent, or Firm* — Canon U.S.A., Inc. IP Division

(57) ABSTRACT

In order to realize a device that can reduce the influence of errors, the device includes a first acquisition unit configured to acquire first information including an error via an image formation optical system, a second acquisition unit configured to acquire second information of which the error is less than that of the first information, a correction information generation unit configured to calculate a correction value for correcting the error of the first information on the basis of the second information, and a correction unit configured to correct the first information by using the correction value.

21 Claims, 12 Drawing Sheets

(51) Int. Cl.
  *G01S 7/4865* (2020.01)
  *G01S 17/10* (2020.01)
  *G01S 17/86* (2020.01)
  *G06T 7/246* (2017.01)
  *H04N 17/00* (2006.01)
  *B60Q 9/00* (2006.01)

(52) U.S. Cl.
  CPC .............. *G01S 17/10* (2013.01); *G01S 17/86* (2020.01); *G06T 7/246* (2017.01); *G06T 7/55* (2017.01); *B60Q 9/00* (2013.01); *G06T 2207/30252* (2013.01)

(58) Field of Classification Search
  CPC ............. G01S 13/867; G01S 2013/932; G01S 17/931; G01S 13/865; G01S 17/933; G01S 2013/9323; G06T 7/246; G06T 7/55; G06T 2207/30252; G06T 2207/20021; G06T 2207/30168; B69Q 9/00; G01C 3/085
  See application file for complete search history.

(56) References Cited

U.S. PATENT DOCUMENTS

| | | | |
|---|---|---|---|
| 11,525,887 B2* | 12/2022 | Voorheis | G01S 7/497 |
| 2016/0260250 A1 | 9/2016 | Jovanovic et al. | |
| 2017/0148168 A1* | 5/2017 | Lindner | G06T 7/593 |
| 2017/0295355 A1* | 10/2017 | Tanaka | H04N 13/128 |
| 2019/0120955 A1* | 4/2019 | Zhong | G01S 13/584 |
| 2019/0128669 A1* | 5/2019 | Nobayashi | G01C 3/085 |
| 2019/0349571 A1 | 11/2019 | Herman et al. | |

OTHER PUBLICATIONS

Web page with the definition of "Optical Flow." 3D A to Z: An Encyclopedic Dictionary @2012 McFarland & Company, Inc., Publishers at Credo Reference at https://search.credoreference.com/articles/Qm9va0FydGljbGU6MzAyNDI3Mg==?q=%22optical+flow%22&aid=279753 (Year: 2012).*

* cited by examiner

FEATURE POINTS OF IMAGE SIGNAL S21 (TIME t2)

FEATURE POINTS OF IMAGE SIGNAL S11 (TIME t1)

CALCULATED OPTICAL FLOW

DISTANCE MEASUREMENT DEVICE, MOVING DEVICE, DISTANCE MEASUREMENT METHOD, CONTROL METHOD FOR MOVING DEVICE, AND STORAGE MEDIUM

TECHNICAL FIELD

The aspect of the embodiments relates to a distance measurement device, a moving device, a distance measurement method, a control method for the moving device, a storage medium, and the like.

DESCRIPTION OF THE RELATED ART

There is a proposal of an imaging device having a distance measurement function for acquiring a defocus state of a subject or distance information such as a distance from the imaging device to the subject (hereinafter, referred to as a subject distance) on the basis of parallax image signals captured from different viewpoints.

In an imaging device having such a distance measurement function, a relative positional relationship between an optical system and an imaging sensor may shift due to expansion and contraction of a lens or a lens barrel due to heat, and thus a distance measurement error may occur.

In International Publication No. WO2010/010707, a correction coefficient for correcting such a distance measurement error is created by using the temperature detected by a temperature sensor. However, in Patent Literature 1, since a temperature sensor is required separately and only the temperature near the temperature sensor is known, there are cases where a temperature change cannot be accurately detected if there is a distribution (variation) in the temperature on a sensor surface or a lens, and a distance measurement error cannot be corrected with high accuracy.

SUMMARY

According to the aspect of the embodiments, there is provided a device including at least one processor; and a memory coupled to the at least one processor, the memory having instructions that, when executed by the processor, performs operations as: a first acquisition unit configured to acquire first information including an error via an optical system; a second acquisition unit configured to acquire second information of which the error is less than that of the first information; a generation unit configured to calculate a correction value for correcting the error of the first information based on the second information; and a correction unit configured to correct the first information by using the correction value.

Further features of the disclosure will become apparent from the following description of embodiments with reference to the attached drawings.

BRIEF DESCRIPTION OF THE DRAWINGS

FIGS. 5B, 5C, and 5D are diagrams for describing calculation of an optical flow, in which FIG. 5B is a diagram illustrating feature points 501 calculated for an image signal S21 at time t2, FIG. 5C is a diagram illustrating feature points 502 calculated for a first image signal S11 at time t1, and FIG. 5D is a diagram illustrating the calculated optical flow.

DESCRIPTION OF THE EMBODIMENTS

Hereinafter, with reference to the accompanying drawings, favorable modes of the present disclosure will be described using embodiments. In each diagram, the same reference signs are applied to the same members or elements, and duplicate description will be omitted or simplified.

In embodiments, an example in which an in-vehicle camera is employed as an imaging device will be described. However, the imaging device may be any of an electronic device having an imaging function such as a digital still camera, a digital movie camera, a smartphone with a camera, a tablet computer with a camera, a network camera, a drone camera, and a camera mounted on a robot.

In the embodiments, an example of an imaging device mounted on an automobile as a moving device will be described, but the moving device is not limited to an automobile and may be any movable device. That is, examples of the moving device include, for example, an automatic guided vehicle (AGV), an autonomous mobile robot (AMR), a cleaning robot, and a drone.

First Embodiment

In the embodiment, distance values acquired according to different methods are converted into image plane defocus amounts and compared to calculate an amount of change over time in an amount of curvature of field as a correction value, and thus the influence of a distance measurement error over time is reduced. This will be described in detail below.

Configuration of Imaging Device

Figure 1A:
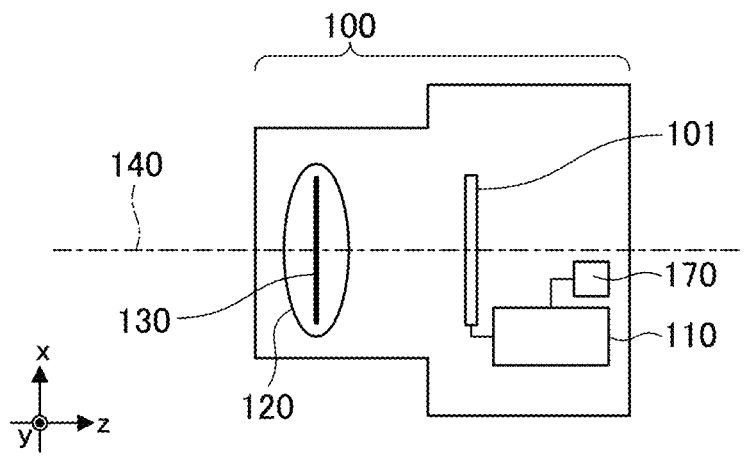
FIG. 1A is a diagram schematically illustrating the configuration of an imaging device according to a first embodiment of the disclosure.

FIG. 1A is a diagram schematically illustrating a configuration of an imaging device according to an embodiment of the disclosure.

In FIG. 1A, an imaging device 100 includes an image formation optical system 120, an image sensor 101, a distance measurement device 110, and an information storage unit 170. The distance measurement device 110 may be configured by using a logic circuit. As another form of the distance measurement device 110, a central processing unit (CPU) and a memory storing an arithmetic processing program may be provided, and the CPU as a computer may execute the computer program stored in the memory.

The image formation optical system 120 is an imaging lens or the like of the imaging device 100, and has a function of forming an image of a subject on the image sensor 101. The image formation optical system 120 is configured with a plurality of lens groups (not illustrated), and has an exit pupil 130 at a position separated from the image sensor 101 by a predetermined distance. In the specification, the z axis is parallel to an optical axis 140 of the image formation optical system 120. The x axis and the y axis are perpendicular to each other and perpendicular to the optical axis.

Configuration of Image Sensor

The image sensor 101 is, for example, an image sensor that is configured with a complementary metal oxide semiconductor (CMOS) or a charge-coupled device (CCD) and has a distance measurement function based on an imaging surface phase difference distance measurement method. A subject image formed on the image sensor 101 via the image formation optical system 120 is photoelectrically converted by the image sensor 101 to generate an image signal based on the subject image. A color image may be generated by subjecting the acquired image signal to a development process by an image generation unit. The generated color image may be stored in the image storage unit.

Figure 1B:
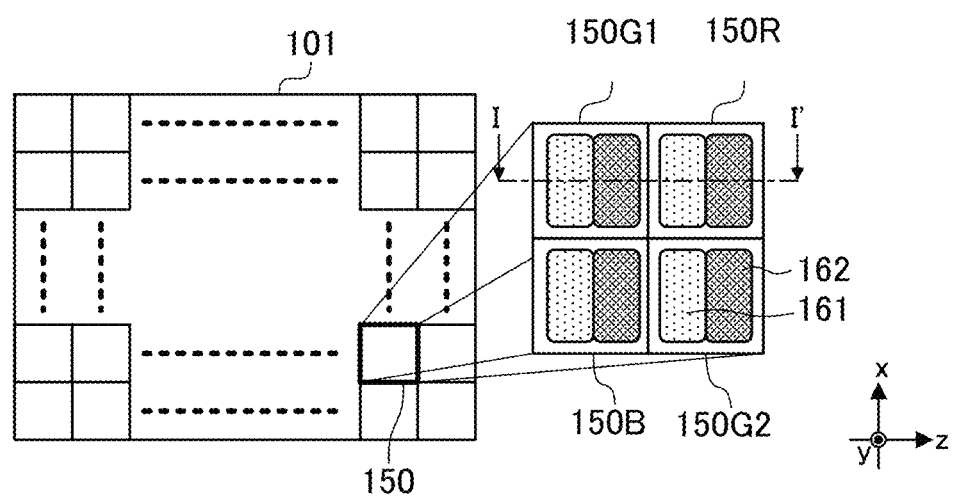
FIG. 1B is an xy sectional view of an image sensor 101 in FIG. 1A.

FIG. 1B is an xy sectional view of the image sensor 101 in FIG. 1A. The image sensor 101 is configured by arranging a plurality of pixel groups 150 in 2 rows×2 columns. The pixel group 150 is configured by arranging green pixels 150G1 and 150G2 diagonally, and red pixels 150R and blue pixels 150B in the other two pixels.

Figure 1C:
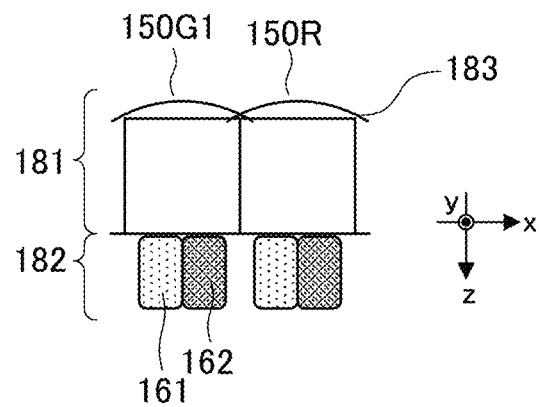
FIG. 1C is a schematic sectional view along I-I' of a pixel group 150 in FIG. 1B.

FIG. 1C is a schematic sectional view along IT of the pixel group 150 in FIG. 1B. Each pixel is configured with a light receiving layer 182 and a light guide layer 181. Two photoelectric conversion portions (a first photoelectric conversion portion 161 and a second photoelectric conversion portion 162) for photoelectrically converting received light are disposed in the light receiving layer 182.

A microlens 183 efficiently guiding a light flux incident on the pixel to the photoelectric conversion portion, a color filter (not illustrated) through which light in a predetermined wavelength bandwidth passes, and a wiring (not illustrated) for image reading and pixel driving are disposed in the light guide layer 181. This is an example of a photoelectric conversion portion divided into two in one pupil division direction (x axis direction), but an imaging device provided with a photoelectric conversion portion divided in two pupil division directions (the x axis direction and the y axis direction) may be used according to specifications. A pupil division direction and the number of divisions can be freely selected.

A combination of colors received by respective pixels is not limited to the illustrated array, and desired spectral characteristics according to a wavelength bandwidth to be detected, such as infrared (IR) or white that does not limit a transmission wavelength bandwidth, are configured in a desired array. The light receiving layer 182 is provided with the photoelectric conversion portion using a semiconductor or the like having sensitivity in a wavelength bandwidth to be detected, and Si or the like is used if the wavelength bandwidth to be detected is in the visible range, but the photoelectric conversion portion is not limited thereto and is made of any material according to a target wavelength bandwidth.

Principle of distance measurement based on pupil division imaging surface phase difference distance measurement method Light fluxes received by the first photoelectric conversion portion 161 and the second photoelectric conversion portion 162 included in the image sensor 101 of the embodiment will be described with reference to FIGS. 2A to 2D.

Figure 2A:
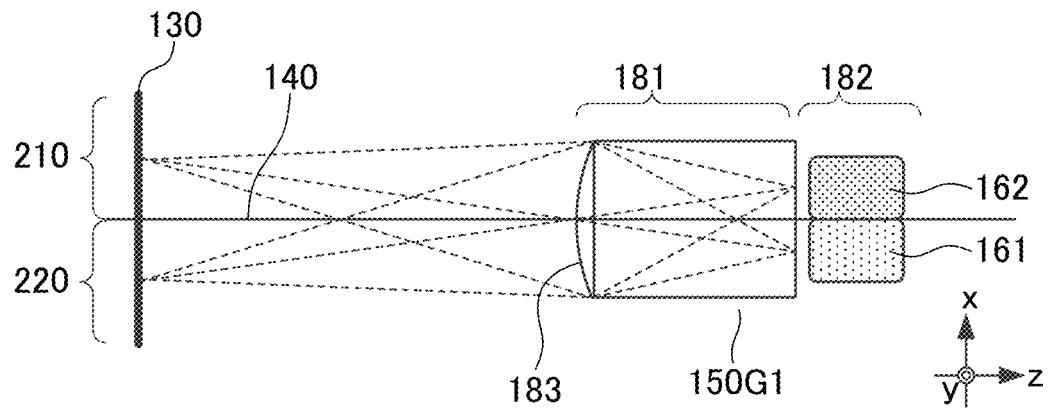
FIG. 2A is a diagram illustrating a relationship between an exit pupil of an image formation optical system and a light receiving portion of the image sensor.

FIG. 2A is a diagram illustrating a relationship between the exit pupil of the image formation optical system and the light receiving portion of the image sensor. The exit pupil 130 of the image formation optical system 120 and the green pixel 150G1 as a representative example of the pixels arranged in the image sensor 101 are illustrated. The exit pupil 130 and the light receiving layer 182 are optically conjugated by the microlens 183 in the pixel 150G1 illustrated in FIG. 2A.

As a result, as illustrated in FIG. 2A, a light flux that has passed through a first pupil region 210 in the exit pupil 130 is incident on the first photoelectric conversion portion 161. On the other hand, a light flux that has passed through a second pupil region 220 is incident on the second photoelectric conversion portion 162.

A plurality of the first photoelectric conversion portions 161 provided in each pixel photoelectrically convert the received light flux to generate a first image signal. Similarly, a plurality of the second photoelectric conversion portions 162 provided in each pixel photoelectrically convert the received light flux to generate a second image signal. It is possible to obtain an intensity distribution of an image formed on the image sensor 101 by the light flux mainly passing through the first pupil region 210 from the first image signal, and obtain an intensity distribution of an image formed on the image sensor 101 by the light flux mainly passing through the second pupil region 220 from the second image signal.

Figure 2B:
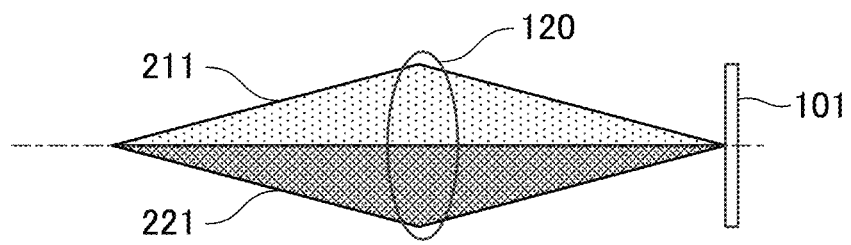
FIG. 2B is a diagram illustrating a state at the time of focusing.
Figure 2C:
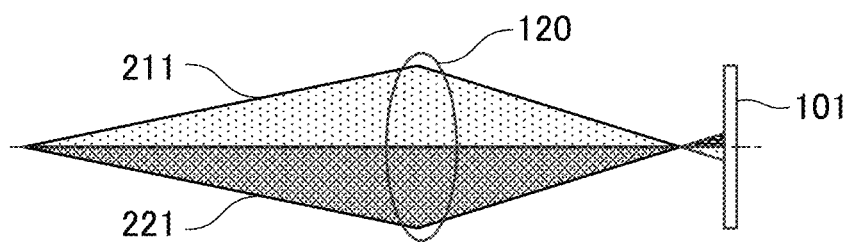
FIG. 2C is a diagram illustrating a defocused state in a negative direction of a z axis on an image space.
Figure 2D:
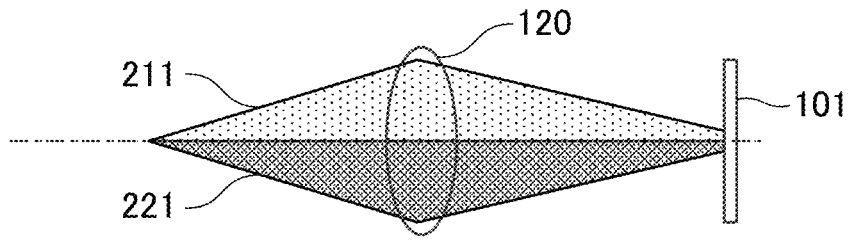
FIG. 2D is a diagram illustrating a defocused state in a positive direction of the z axis on the image space.

A parallax amount between the first image signal and the second image signal is an amount corresponding to a defocus amount. A relationship between the parallax amount and the defocus amount will be described with reference to FIGS. 2B, 2C, and 2D. FIGS. 2B, 2C, and 2D are schematic diagrams illustrating a relationship between the image sensor 101 and an image formation position in the image formation optical system 120 of the embodiment. In the figure, the reference numeral 211 indicates a first light flux passing through the first pupil region 210, and the reference numeral 221 indicates a light flux passing through the second pupil region 220.

FIG. 2B is a diagram illustrating a state at the time of focusing, in which the first light flux 211 and the second light flux 221 converge on the image sensor 101. In this case, a relative positional deviation between the first image signal formed by the first light flux 211 and the second image signal formed by the second light flux 221 is zero. FIG. 2C is a diagram illustrating a defocused state in the negative direction of the z axis on the image space.

In this case, a relative positional deviation amount between the first image signal formed by the first light flux and the second image signal formed by the second light flux is not 0 and has a negative value. FIG. 2D is a diagram illustrating a defocused state in the positive direction of the z axis on the image space. In this case, a relative positional deviation amount between the first image signal formed by the first light flux and the second image signal formed by the second light flux is not 0 and has a positive value.

From the comparison between FIGS. 2C and 2D, it can be seen that directions of positional deviations are switched according to the polarity of a defocus amount. From a geometrical relationship, it can be seen that parallax occurs according to a defocus amount. Therefore, a parallax amount between the first image signal and the second image signal can be detected by a region-based matching method that will be described later, and the detected parallax amount can be converted into a defocus amount via a predetermined conversion coefficient. As described above, in the embodiment, a plurality of parallax image signals having parallax output from light fluxes passing through different pupil regions of the monocular optical system are acquired by one image sensor, and first distance information is acquired on the basis of the plurality of signals. However, the acquisition is not limited to one image sensor, and may be performed by a plurality of image sensors.

By using an image formation relationship of the image formation optical system 120 described by using Equation 2 that will be described later, a defocus amount on the image space can be converted into a distance from a subject to the imaging device 100 (hereinafter, referred to as a subject distance).

Description of Distance Measurement Device

Figure 3A:
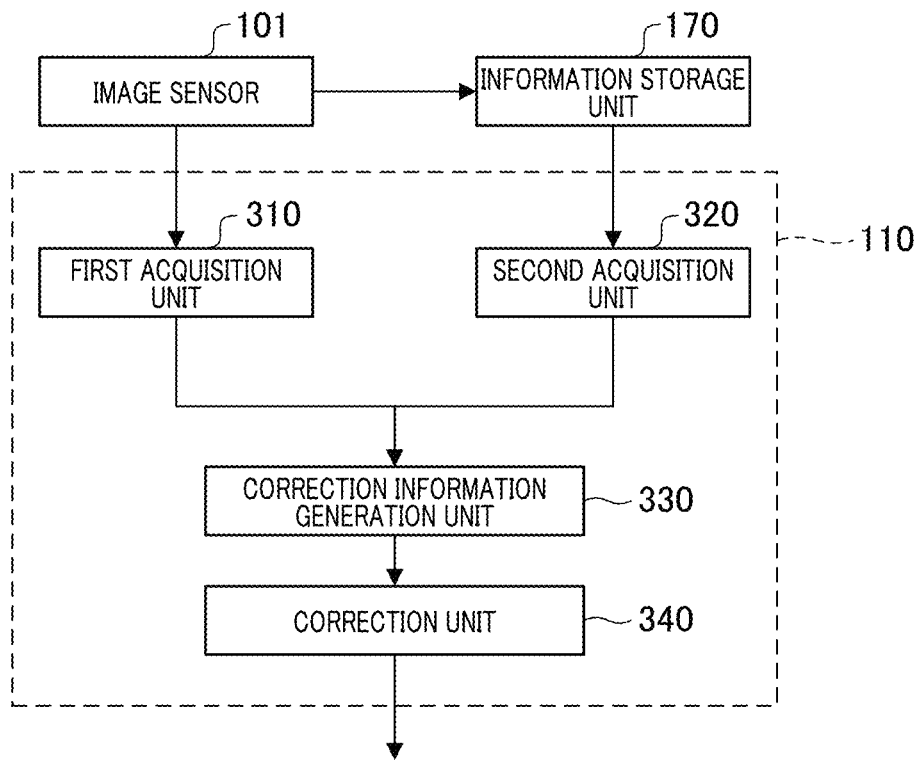
FIG. 3A is a functional block diagram illustrating an outline configuration of a distance measurement device 110 of the first embodiment.
Figure 3B:
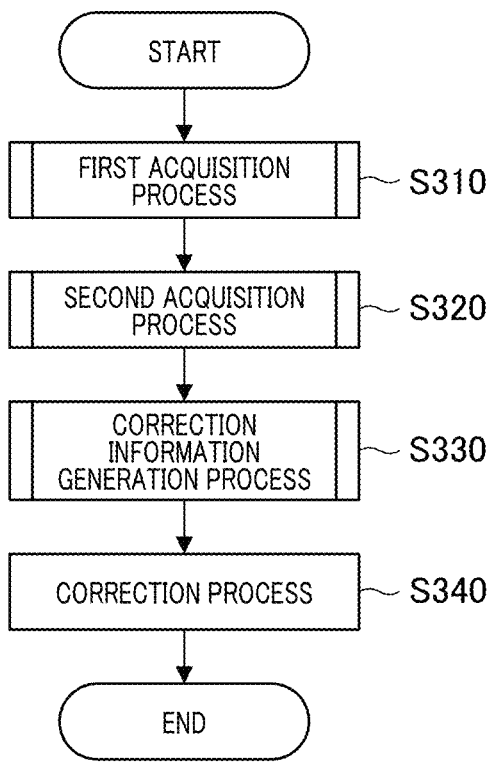
FIG. 3B is a flowchart illustrating an operation of the distance measurement device 110.
Figure 3C:
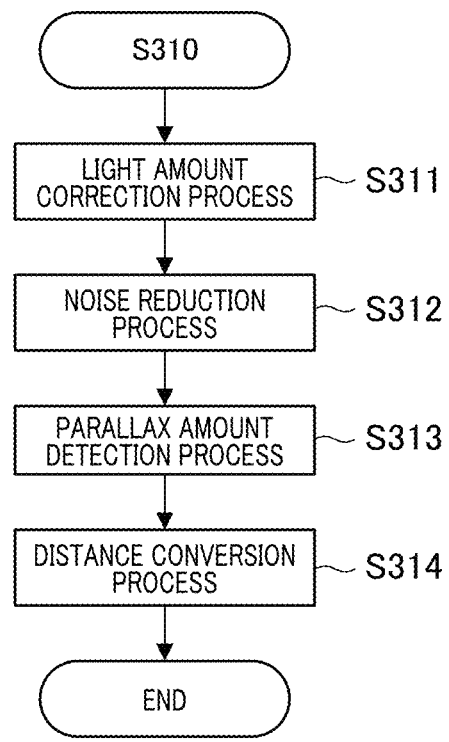
FIG. 3C is a flowchart illustrating a part of the operation in FIG. 3B.

The distance measurement device of the embodiment will be described. FIG. 3A is a functional block diagram illustrating an outline configuration of the distance measurement device 110 of the embodiment, FIG. 3B is a flowchart illustrating an operation of the distance measurement device 110, and FIG. 3C is a flowchart illustrating a part of the operation in FIG. 3B. Each block of FIG. 3A is executed by the central processing unit (CPU) of the distance measurement device 110 executing the computer program stored in the memory to perform each process in FIGS. 3B and 3C, and thus a function of each block in FIG. 3A is realized.

The distance measurement device 110 acquires first distance information Idist1 in a first acquisition unit 310, and acquires second distance information Idist2 in a second acquisition unit 320. The first acquisition unit 310 acquires the first distance information including an error (an error of the imaging device over time or a manufacturing error) via the image formation optical system, and the second acquisition unit 320 acquires the second distance information including an error less than that in the first distance information. The error includes an error over time or a manufacturing error, but in the following embodiments, the error over time will be mainly described.

A correction information generation unit 330 acquires a correction value Ic from the first distance information Idist1 and the second distance information Idist2. That is, the correction information generation unit 330 calculates the correction value Ic for correcting the error over time of the first distance information on the basis of the second distance information. A correction unit 340 generates and outputs corrected distance information IdistC by correcting the first distance information Idist1 by using the correction value Ic. That is, the correction unit 340 corrects the first distance information by using the correction value.

Hereinafter, details of processes executed by the first acquisition unit 310, the second acquisition unit 320, the correction information generation unit 330, and the correction unit 340 will be described.

Acquisition of First Distance Information

The first acquisition unit 310 executes a first acquisition process in step S310 by using a first image group Sg1 acquired from the image sensor 101, and acquires the first distance information Idist1 indicating a distance to the subject (first acquisition step).

The first image group Sg1 includes a first image signal S11 generated by the first photoelectric conversion portion 161 and a second image signal S12 generated by the second photoelectric conversion portion 162. Hereinafter, details of the first acquisition process in step S310 will be described with reference to FIG. 3C.

In step S311, the first acquisition unit 310 corrects a difference in an amount of light between the first image signal S11 and the second image signal S12. Due to the image formation optical system 120, a light amount balance is lost between the first image signal S11 and the second image signal S12. In step S311, a light amount correction process between the first image signal S11 and the second image signal S12 is executed by using a light amount correction value stored in the information storage unit 170.

It is not always necessary to use the light amount correction value stored in the information storage unit. For example, a light amount correction value may be generated on the basis of an area ratio between the first pupil region 210 and the second pupil region 220, and then light amount correction may be executed.

In step S312, the first acquisition unit 310 executes a noise reduction process for reducing noise generated in the image sensor 101. Specifically, a filtering process using a bandpass filter is executed on the first image signal S11 and the second image signal S12. In general, the higher a spatial frequency, the lower an SN ratio (a ratio of a signal component to a noise component), and thus the relatively larger the noise component.

Therefore, a low-pass filter of which a passing ratio decreases as a frequency increases is used. Even after the light amount correction process in step S311, a design value may not always be obtained due to a manufacturing error or the like of the image formation optical system 120. Thus, for example, a bandpass filter or the like of which a passing ratio of a frequency bandwidth at the spatial frequency=0 is 0 and a passing ratio of a high frequency bandwidth is low is used.

In step S313, the first acquisition unit 310 executes a parallax amount detection process of calculating a parallax amount between the first image signal S11 and the second image signal S12. Specifically, a point of interest is set in the first image signal S11, and a collation region centered on the point of interest is set. The collation region is formed of, for example, a rectangular shape having a side having a predetermined length centered on the point of interest, but is not limited thereto.

Next, a reference point is set in the second image signal S12, and a reference region centered on the reference point is set. The reference region has the same size and shape as those of the collation region. While sequentially moving the reference points, the degree of correlation between the first image signal S11 included in the collation region and the second image signal S12 included in the reference region is calculated, and the reference point having the highest correlation is set as a corresponding point corresponding to the point of interest. An amount of relative positional deviation between the point of interest and the corresponding point is a parallax amount at the point of interest.

The first acquisition unit 310 can calculate parallax amounts at a plurality of pixel positions by calculating the parallax amounts while sequentially changing the points of interest. A known method may be used as a method for calculating the degree of correlation. For example, a method called normalized cross-correlation (NCC) for evaluating a normalized cross-correlation between image signals, sum of squared difference (SSD) for evaluating a sum of squares of differences in image signal sums, or sum of absolute difference (SAD) for evaluating an absolute value of a difference may be used.

If these methods of calculation the degree of correlation are used, reliability information indicating the reliability of calculated distance information can be generated by using a texture amount or frequency component information of each pixel block.

In step S314, the distance conversion process is executed. That is, the first acquisition unit 310 converts the parallax amount into a distance (defocus amount) from the image sensor 101 to the image formation point by the image formation optical system 120 by using a predetermined conversion coefficient. Hereinafter, the coefficient used to convert the parallax amount into the defocus amount will be referred to as a BL value. When the BL value is BL, the defocus amount is $\Delta L$, and the parallax amount is d, the parallax amount d may be converted into the defocus amount $\Delta L$ by using the following Equation 1.

$$\Delta L = BL \times d \quad (1)$$

The first acquisition unit 310 can acquire the first distance information Idist1 including defocus amounts at a plurality of pixel positions as distance information by converting the parallax amounts into the defocus amounts at the plurality of pixel positions.

In order to convert this defocus amount into a subject distance, the following Equation 2 which is the lens formula in geometrical optics may be used.

$$1/A + 1/B = 1/f \quad (2)$$

A represents a distance from an object surface to a principal point of the image formation optical system 120, B represents a distance from the principal point of the image formation optical system 120 to an image plane, and f represents a focal length of the image formation optical system 120.

In Equation 2, the focal length is a known value. A value of B may be calculated by using a defocus amount. Therefore, the distance A to the object surface that is, the subject distance may be calculated by using the focal length and the defocus amount. The method of acquiring distance information of a subject according to such a method will be referred to as a phase difference distance measurement method, and in particular, the method of acquiring distance information from signals acquired from different pupil regions of one optical system as described above will be referred to as a pupil division phase difference method.

In this case, if the distance B from the principal point of the image formation optical system 120 to the image plane obtained by using the calculated defocus amount has an error, the distance A to the object surface calculated from Equation 2 that is, the subject distance also includes an error.

As a factor that causes the above error, there is a change over time of the imaging device 100 that occurs due to the influence of changes in surrounding temperature and humidity, vibration, and the like. Specifically, the change over time is a change in optical characteristics due to a change in a refractive index or a curvature of each lens of the image formation optical system 120 due to changes in the surroundings, or deformations such as deflection of the image sensor 101 due to changes in the surroundings. An error also occurs due to manufacturing errors.

Due to a difference between the assumed image plane position of the image formation optical system 120 and the actual image formation position, a conversion relationship between the defocus amount and the distance from the object surface to the principal point of the image formation optical system 120 is broken. Thus, an error occurs in a value of the distance B from the principal point of the image formation optical system 120 to the image plane. Hereinafter, a difference between an assumed image plane position of the image formation optical system 120 and the actual image formation plane position will be referred to as an image space change amount. Even if the image space change amount is not 0, a relationship between the defocus amount and the subject distance follows Equation 2. Therefore, if the defocus amount is corrected by using a correctly estimated image space change amount, the distance A that is a subject distance with reduced error can be obtained.

As described above, the first acquisition unit 310 acquires the first distance information on the basis of the first signal and the second signal having parallax output from the image sensor 101 via the image formation optical system. The number of signals having parallax may be two or more. If the first distance information is acquired according to such a pupil division phase difference method, as described above, the first distance information includes an error over time in the characteristics of the image formation optical system or the image sensor.

There are a plurality of factors that cause an image space change amount not to be 0 due to changes over time. For example, a case where the optical characteristics of the image formation optical system 120 change over time due to temperature changes will be described.

Figure 4A:
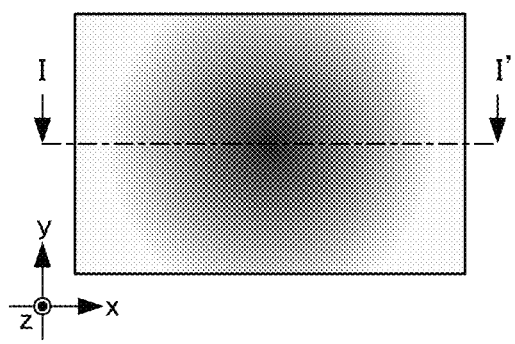
FIG. 4A is a diagram illustrating a two-dimensional distribution of an amount of curvature of field of an image formation optical system 120 within an effective pixel range of the image sensor 101.
Figure 4B:
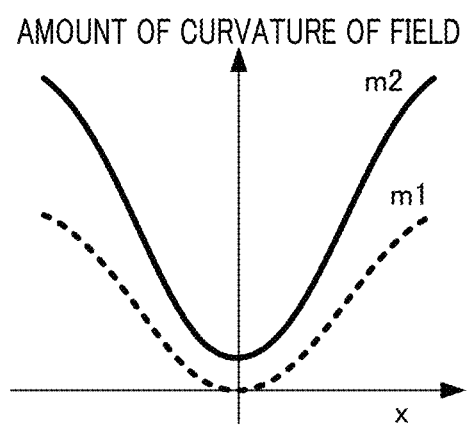
FIG. 4B is a diagram illustrating an amount of curvature of field along I-I' in FIG. 4A.

FIG. 4A is a diagram illustrating a two-dimensional distribution of an amount of curvature of field of the image formation optical system 120 within an effective pixel range of the image sensor 101, and FIG. 4B is a diagram illustrating an amount of curvature of field along the line IT in FIG. 4A.

Figure 4C:
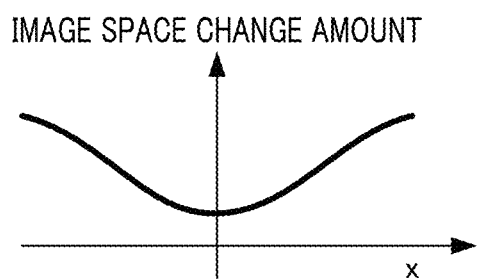
FIG. 4C is a diagram illustrating an image space change amount along I-I' in FIG. 4A.

In FIG. 4B, m1 represents an amount of curvature of field when there is no change over time, and m2 represents an amount of curvature of field when there is a change over time. A difference between m1 and m2 in the figure is the above image space change amount. FIG. 4C is a diagram illustrating an image space change amount along I-I' in FIG. 4A. As illustrated in FIG. 4C, if the optical characteristics of the image formation optical system 120 change over time, the image space change amount changes according to an angle of view. In a case where the image space change amount is a constant value regardless of an angle of view, image space change amount can be corrected if there is at least one piece of correction information.

However, if the image space change amount changes according to an angle of view, it is difficult to estimate the image space change amount by using only one piece of correction information. In this case, a two-dimensional distribution of the image space change amount is estimated. In order to generate the correction value Ic, in the embodiment, the correction value Ic is generated by using the second distance information acquired by an acquisition unit different from the first acquisition unit.

In the embodiment, as described above, the first acquisition unit 310 acquires the first distance information Idist1 representing a distance to the subject by using the first image group Sg1 acquired from the image sensor 101. The first image group Sg1 acquired from the image sensor 101 is temporarily stored in the information storage unit 170, and the second acquisition unit uses the first image group Sg1 stored in the information storage unit 170 as a second image group Sg2 to acquire the second distance information Idist2.

Acquisition of Second Distance Information

The second acquisition unit 320 acquires the first image group Sg1 and the second image group Sg2 acquired from the information storage unit 170. Here, the second image group Sg2 is an image group in which image signals at times before the first image group Sg1 are stored in the information storage unit 170. The second acquisition unit 320 acquires the second distance information Idist2 by using the first image group Sg1 and the second image group Sg2. The second image group Sg2 includes a first image signal S21 and a second image signal S22 captured by the imaging device 100 at a timing different from that of the first image group Sgt.

As described above, in the embodiment, the second acquisition unit acquires the second distance information on the basis of image signals of two frames, but may acquire the second distance information on the basis of image signals of three or more frames.

As described above, the first image signal S21 is an image signal generated by the first photoelectric conversion portion 161 and the second image signal S22 is an image signal generated by the second photoelectric conversion portion 162.

The second acquisition unit 320 acquires the second distance information Idist2 by using a structure from motion (SfM) method that is a well-known method. Hereinafter, in step S320, details of the second acquisition process executed by the second acquisition unit 320 will be described with reference to FIG. 5A.

Figure 5A:
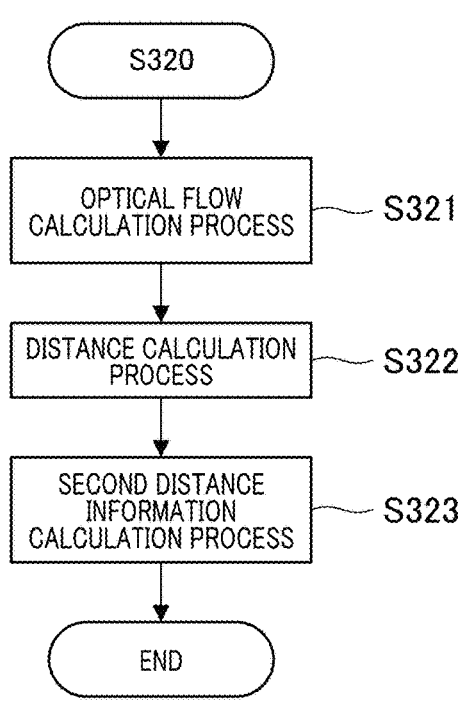
FIG. 5A is a flowchart illustrating an operation of a second acquisition process executed by a second acquisition unit 320.

FIG. 5A is a flowchart illustrating an operation (second acquisition step) in the second acquisition process executed by the second acquisition unit 320 in step S320.

The central processing unit (CPU) of the distance measurement device 110 executes each process in FIG. 5A by executing the computer program stored in the memory.

In step S321, an optical flow calculation process is executed. That is, the image signal S11 is acquired from the first image group Sg1 acquired at time t1 and stored in the information storage unit 170, and the image signal S21 is acquired from the second image group Sg2 captured at different time t2. An optical flow is calculated from each image signal according to a well-known method. The time relationship is t1>t2, and t2 is a time series past t1.

A plurality of images for which the optical flow is calculated may be image signals from the same viewpoint, and may be calculated from the second image signals S12 and S22. Alternatively, a plurality of images may be calculated from a sum (S11+S12) of the first image signal and the second image signal of the first image group Sg1 and a sum (S21+S22) of those of the second image group Sg2.

Figure 5B:
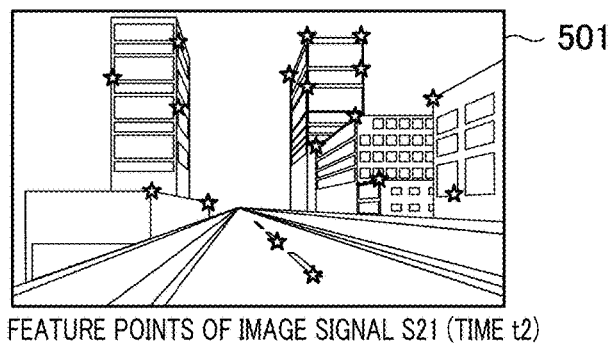

The calculation of the optical flow will be specifically described with reference to FIGS. 5B, 5C, and 5D. Feature points are calculated for the acquired image signal S11 and image signal S21 by using the Harris corner detection algorithm that is a well-known method. FIG. 5B is a diagram illustrating feature points 501 calculated for the image signal S21 at time t2, FIG. 5C is a diagram illustrating feature points 502 calculated for the first image signal S11 at time t1, and FIG. 5D is a diagram illustrating a calculated optical flow.

Figure 5C:
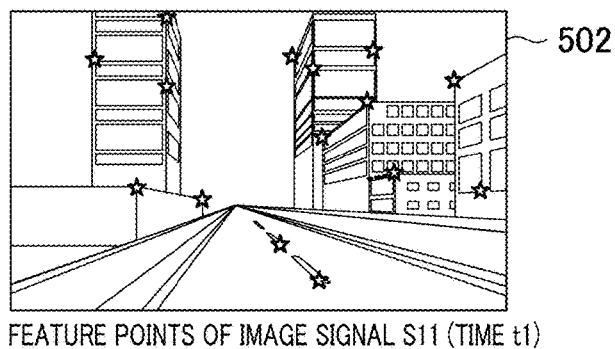
Figure 5D:
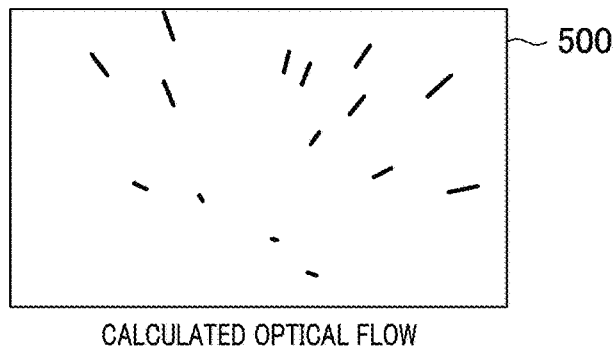

The feature point 501 calculated for the image signal S21 at time t2 is illustrated as a star in FIG. 5B, and the feature point 502 calculated for the first image signal S11 at time t1 is illustrated as a star in FIG. 5C. FIG. 5D illustrates an optical flow 500 calculated by using a Kande-Lucas-Tomasi (KLT) feature tracking algorithm that is a well-known method for associating feature points between the calculated image signal S21 and the image signal S11.

An algorithm used for calculating a feature point or a feature amount and calculating an optical flow is not limited to the above method. Features from accelerated segment test (FAST), binary robust independent elementary features (BRIEF), oriented fast and rotated BRIEF (ORB), and the like may be used.

In step S322, a distance calculation process is executed. That is, a distance to the subject is calculated by a well-known method by using the calculated optical flow 500. Coordinates in the image coordinate system of the subject to which the distance is calculated are indicated by (u, v), an optical flow of the subject to which the distance is calculated is indicated by ($\Delta u$, $\Delta v$), and the distance to the subject is indicated by z. Of camera movement amounts between images used when calculating the optical flow, a rotational movement amount is indicated by ($\omega x$, $\omega y$, $\omega z$), and a translational movement amount is indicated by (tx, ty, tz). If a focal length of the camera is indicated by f, the following relationship is established.

$$\Delta u = -\omega_y f - \frac{t_x f}{z} + \frac{t_z}{z}u + \omega_z v + \frac{\omega_x}{f}uv - \frac{\omega_y}{f}u^2 \tag{3}$$

-continued $$\Delta v = \omega_x f - \frac{t_y f}{z} + \frac{t_z}{z} y - \omega_z u + \frac{\omega_y}{f} uv - \frac{\omega_x}{f} v^2 \quad (4)$$

The focal length f of the camera can be known in advance through pre-calibration. Therefore, if the rotational movement amount ($\omega x$, $\omega y$, $\omega z$) and the translational movement amount (tx, ty, tz), which are the camera movement amounts, are obtained, the distance z to the subject from the camera at the subject position (u, v) on the image can be calculated from the optical flow.

A camera movement amount between the image signal S21 and the image signal S11 used for calculating the optical flow 500 is calculated according to a well-known method. Specifically, a camera fundamental matrix F is acquired by using the 8 Point algorithm such that the epipolar constraint is satisfied by using the feature points 501 at time t2, the feature points 502 at time t1, and the optical flow 500 that is a correspondence relationship therebetween. In this case, in one embodiment, outliers are efficiently be excluded by using the random sample consensus (RANSAC) method and calculate the camera basic matrix according to a stable method.

The camera fundamental matrix F is decomposed into camera essential matrix E by using a well-known method, and the rotational movement amount R($\omega x$, $\omega y$, $\omega z$) and the translational movement amount T(tx, ty, tz), which are extrinsic parameters of the camera, are obtained from the camera essential matrix E. Here, the obtained camera extrinsic parameters are the relative displacement of the camera movement amount from time t2 to time t1, and the scaling is indefinite. Therefore, in particular, the translational movement amount T(tx, ty, tz) is a standardized relative value.

By scaling this, the translational movement amount T (tx, ty, tz) that is an actual movement amount is obtained. Specifically, the second image signal S12 corresponding to an image signal from a different viewpoint at the same time as that of the first image signal S11 for which the feature points 502 are obtained is acquired from the information storage unit 170. Similarly, the image signal S22 corresponding to an image signal from a different viewpoint at the same time as that of the image signal S21 for which the feature points 501 are obtained is acquired from the information storage unit 170.

By executing the first acquisition process in step S310 on the respective image sets, each distance value is acquired from the first distance information based on the parallax amount. Thereafter, a movement amount tz parallel to the optical axis of the camera in the translational movement amount T is acquired from a distance value difference between the feature points 502 and the feature points 501 associated with each other in the optical flow.

The other components are also scaled on the basis of the acquired actual movement amount tz that has already been scaled, and the actual translational movement amount T(tx, ty, tz) from time t2 to t1 is acquired. By using Equations 3 and 4, the distance z from the camera at each coordinate on the image of the feature point 502 of the first image signal S11 is calculated.

A method for scaling a camera movement amount is not limited to this method, and a camera movement amount may be obtained from various measurement devices, specifically, an inertial measurement unit (IMU) and a global navigation satellite system (GNSS), or vehicle speed information, GPS information, or the like in a case of an in-vehicle camera and scaled.

Bundle adjustment that is a well-known method may be used to calculate a camera movement amount and a positional relationship between a subject and a camera. A relationship between variables such as a camera basic matrix and an optical flow, including the intrinsic parameters of the camera such as the focal length, may be calculated analytically together such that the consistency is improved by a nonlinear least squares method.

Among the feature points used to calculate the camera movement amount, a feature point calculated from a subject that is not a stationary object with respect to the world coordinate system to which the imaging device belongs may be excluded from the processing. In the camera movement amount estimation that is a well-known method, various parameters are calculated assuming that a subject is a stationary object, which causes an error when the subject is a moving object.

Therefore, the accuracy of various parameter calculation can be improved by excluding feature points calculated from a moving object. The determination of a moving object is executed by classifying a subject using an image recognition technique or comparing relative values between an amount of time-series change in acquired distance information and a movement amount of the imaging device.

In step S323, a second distance information conversion process is executed. That is, the distance from the camera at each coordinate on the image of the feature point 502 of the first image signal S11 acquired as described above is converted into a defocus amount on the image space by using Equation 2, and the second distance information Idist2 is acquired. As described above, the second acquisition unit acquires the second distance information by calculating an optical flow of target feature points from a plurality of images.

Calculation of Correction Information and Principle of Correction

The correction information generation unit 330 generates and acquires the correction value Ic corresponding to an image space change amount from the first distance information Idist1 and the second distance information Idist2. A method of generating the correction value Ic corresponding to an image space change amount from the first distance information Idist1 and the second distance information Idist2 will be described below.

The first distance information Idist1 is derived on the basis of the parallax amount calculated by the first acquisition unit, and as illustrated in FIGS. 2B, 2C, and 2D, the parallax amount corresponds to a centroid gap between the first light flux and the second light flux based on a positional relationship between an image formation plane of the image formation optical system and the image sensor. Therefore, if the image formation plane of the image formation optical system or a shape of the image sensor changes due to changes in the surrounding environment such as temperature and humidity, values will be different from those before the change due to the influence. That is, the first distance information Idist1 calculated by the first acquisition unit is susceptible to changes over time in the optical system.

On the other hand, the second distance information Idist2 is calculated from the optical flow associated with the image group acquired at a much shorter time interval than the time interval at which changes in the surrounding environment such as temperature and humidity occur. Therefore, the first distance information used when calculating the distance information also uses a relative change in the short time interval as a camera movement amount, and thus does not include an error quantity over time due to changes in the surrounding environment such as temperature and humidity. That is, the influence of the change over time of the optical system of the second distance information Idist2 calculated by the second acquisition unit is much smaller than that of the first distance information Idist1.

However, the second distance information Idist2 is information that depends on coordinates for which the feature points are calculated, and is thus sparse distance information with respect to an angle of view.

Therefore, in one embodiment, the correction value Ic corresponding to an image space change amount due to the change in the surrounding environment is calculated by using the second distance information Idist2. Consequently, by correcting the first distance information Idist1 to calculate corrected distance information IdistC, it is possible to reduce an error quantity over time and acquire dense distance information with respect to an angle of view. If dense distance information can be acquired, it is possible to measure a fine shape of an object.

Figure 6A:
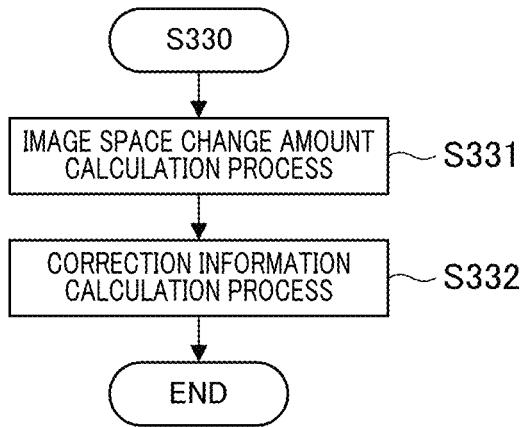
FIG. 6A is a flowchart illustrating an operation of a correction information generation process executed by a correction information generation unit 330 in step S330.

FIG. 6A is a flowchart illustrating an operation in the correction information generation process executed by the correction information generation unit 330 in step S330. Each process in FIG. 6A is executed by the central processing unit (CPU) of the distance measurement device 110 by executing the computer program stored in the memory.

In step S331, an image space change amount calculation process of calculating an image space change amount by using the first distance information Idist1 acquired by the first acquisition unit 310 and the second distance information Idist2 acquired by the second acquisition unit 320 is executed.

Figure 6B:
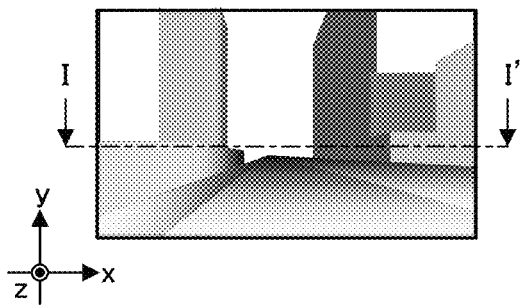
FIG. 6B is a diagram illustrating a defocus amount corresponding to a defocus amount D1 which is first distance information Idist1 acquired by a first acquisition unit 310 with respect to an assumed image plane.
Figure 6C:
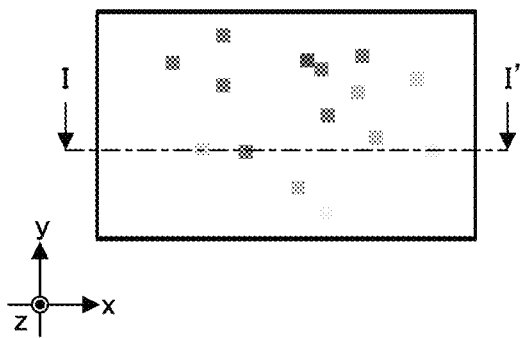
FIG. 6C is a diagram illustrating a defocus amount corresponding to a defocus amount D2 which is second distance information Idist2 acquired by the second acquisition unit 320 with respect to the assumed image plane.
Figure 6D:
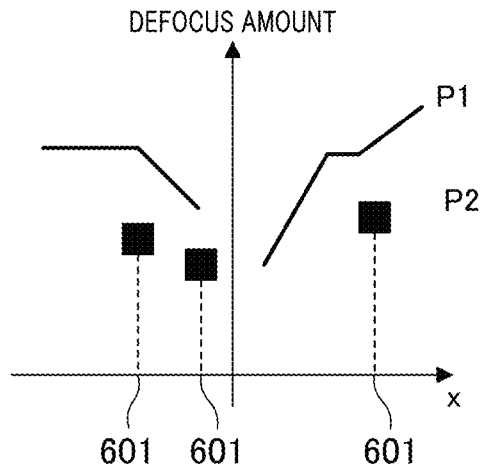
FIG. 6D is a diagram illustrating an image space defocus amount along I-I' in FIGS. 6B and 6C.

FIG. 6B is a diagram illustrating a defocus amount corresponding to a defocus amount D1 that is the first distance information Idist1 acquired by the first acquisition unit 310 with respect to the assumed image plane. FIG. 6C is a diagram illustrating a defocus amount corresponding to a defocus amount D2 that is the second distance information Idist2 acquired by the second acquisition unit 320 with respect to the assumed image plane. FIG. 6C is a sparse data group corresponding to each coordinate of the feature point 502 on the image because the distance information is acquired by pixels corresponding to the feature point 502. FIG. 6D is a diagram illustrating an image space defocus amount along I-I' in FIGS. 6B and 6C.

A discontinuous line segment P1 in FIG. 6D includes the defocus amount D1 that is the first distance information Idist1, and point data P2 in FIG. 6D indicates the defocus amount D2 that is the second distance information Idist2. As described above, the first distance information Idist1 includes an error due to a change over time in the imaging device 100. On the other hand, the second distance information Idist2 is hardly influenced by the change over time in the imaging device 100. Therefore, if a difference value between the two is obtained, the difference value corresponds to an image space change amount influenced by the change over time.

Figure 6E:
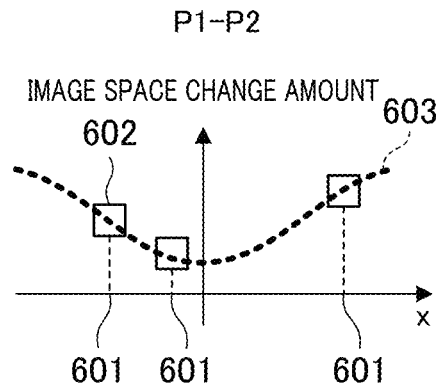
FIG. 6E is a diagram illustrating an image space change amount calculated through fitting with a dashed line.

FIG. 6E is a diagram illustrating an image space change amount calculated through fitting with a dashed line. FIG. 6E illustrates an image space change amount obtained by subtracting P2 that is the defocus amount D2 that is the second distance information Idist2 from P1 that is the defocus amount D1 that is the first distance information Idist1 in FIG. 6D. In the example illustrated in FIG. 6, difference data 602 of P1-P2 can actually be acquired at three points on data acquisition coordinates 601 illustrated in FIG. 6E corresponding to the coordinates of the feature points 502 in FIG. 5C.

In contrast, an image space change amount influenced by the change over time is a change in a focusing position in each pixel, that is, it corresponds to a change in an amount of curvature of field. Since an amount of curvature of field itself has a continuous and smooth shape, an image space change amount between angles of view, that is, between pixels is continuously and smoothly connected. Therefore, gaps between angles of view can be interpolated through fitting according to polynomial approximation by using each difference data 602 acquired on each data acquisition coordinate 601.

An image space change amount 603 obtained through the polynomial approximation as described above is illustrated by a dashed line in FIG. 6E. For the sake of description, an image space change amount obtained through polynomial approximation is expressed in one dimension along the line segment I-I', but an actual image space change amount is two-dimensional data on the xy plane. Therefore, by using the acquired difference data that is discrete with respect to an angle of view, surface fitting is executed through polynomial approximation on the xy plane, and an image space change amount is estimated. Approximate plane data that is the calculated image space change amount is used as the correction value Ic.

As described above, a distance value or a defocus amount acquired by each acquisition unit may take a discrete value depending on a distance to a subject to be imaged. However, by converting the distance information acquired according to each method into an image space defocus amount and obtaining a difference value, the distance information can be handled as a continuous value, and a value or a shape thereof can be estimated and acquired through various types of approximation.

When executing surface fitting based on polynomial approximation by using the difference data and estimating an image space change amount, in one embodiment, an outlier of the difference data is removed based on an image space change amount estimated from design values of the image formation optical system or the image sensor. That is, it is possible to predict an image space change amount in advance through simulation from design values of the device and changes in the temperature and humidity of the environment.

The fitting accuracy is improved by storing this predicted value as an initial value for correction in an information storage unit as a look-up table or the like, comparing the predicted value with the acquired difference data, and removing outliers through threshold value determination. That is, the initial value may include an image space change amount based on the environmental temperature, and the correction information generation unit may acquire the initial value for correction related to the image formation optical system or the image sensor from the look-up table and calculate the correction value.

In step S340 in FIG. 3B, the generated correction value Ic is used to correct the first distance information Idist1, and thus the corrected distance information IdistC is generated (correction step). Specifically, when the first acquisition unit converts the defocus amount $\Delta L$ generated in the distance conversion process in step S314 into B (a distance from the principal point of the image formation optical system 120 to the image plane) in Equation 2, a defocus amount $\Delta L'$ corrected by the following Equation 5 is used.

$$\Delta L' = \Delta L - Ic \qquad (5)$$

The corrected distance information IdistC is calculated by calculating a distance to the subject on the basis of Equation 2 by using the distance B from the principal point of the image formation optical system 120 calculated by using this corrected defocus amount ΔL' to the image plane.

As described above, according to the embodiment, it is possible to realize a distance measurement device capable of acquiring a distance value in which the influence of an error over time is reduced.

The above correction process does not have to be executed every time a distance is calculated. Since the time interval in which a change over time occurs due to the environment is much longer than the time interval in which the device calculates the distance, the correction value Ic calculated here can be used for a while after the next frame. Determination of an update timing of the correction information will be described later.

Since the change over time occurs as an image plane change amount according to the generation principle, in one embodiment, the distance information is corrected not by using a subject distance on the object side but by using a defocus amount on the image space as in the embodiment of the disclosure.

In the embodiment, the correction information generation unit compares (difference calculation) the first distance information and the second distance information as the image space defocus amount. Therefore, it is possible to calculate correction information by collectively approximating all angles of view at the same scale without being influenced by a vertical magnification of the optical system and regardless of whether a distance to the subject is short or long. As a result, there is an effect that a large number of data points used for approximation can be secured and thus correction information can be calculated with high accuracy.

If the characteristics of the image formation optical system 120 change over time due to changes in temperature and humidity or the influence of vibration, not only the image space change amount but also the focal length and BL value change, which may cause a distance measurement error. However, even if the focal length or BL value changes, as is clear from Equations 1 and 2, an amount of change therein is pushed into an amount of change in B, and thus it can be corrected through the correction process according to the embodiment.

In the above embodiment, a set of two images captured at two different times is used as a set of images used for optical flow calculation in the second acquisition unit, but any set of images may be used. By increasing the number of sets, the number of combinations of images for calculating the optical flow increases, and a camera movement amount and the calculation accuracy of the second distance information can be improved.

The image group at time t1 and time t2 may be acquired by a person holding a camera and walking and moving.

Various arithmetic processes do not have to be provided inside an imaging device such as a camera. For example, there may be a configuration in which data is sent to an external server or terminal via a network and executed by using a CPU, a GPU, or an IC mounted on the server or the terminal.

Second Embodiment

Next, a second embodiment of the disclosure will be described with reference to FIG. 7 and other drawings.

Configuration of Distance Measurement System

Figure 7A:
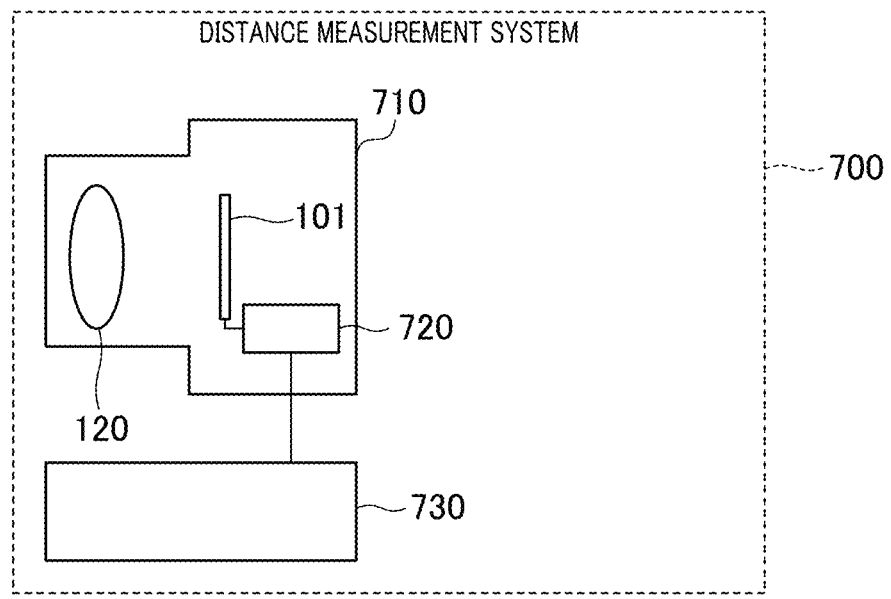
FIG. 7A is a block diagram schematically illustrating a configuration of a distance measurement system according to a second embodiment of the present disclosure.

FIG. 7A is a block diagram schematically illustrating a configuration of a distance measurement system according to the second embodiment of the disclosure.

In FIG. 7A, a distance measurement system 700 of the second embodiment includes an imaging device 710, a distance measurement device 720, and a second distance measurement device 730.

The second distance measurement device 730 acquires second distance information indicating a distance to a subject by receiving return light of applied laser light.

Configuration of Second Distance Measurement Device

Figure 7B:
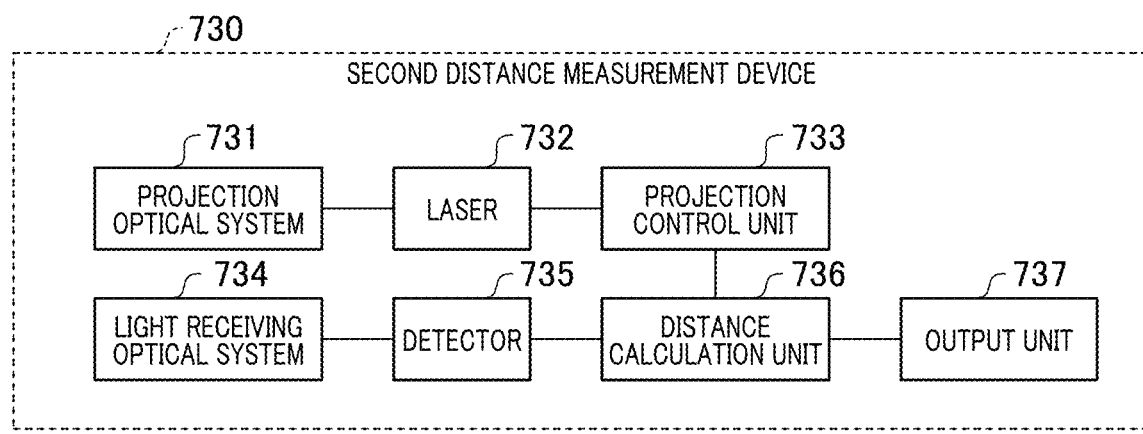
FIG. 7B is a diagram illustrating a configuration example of a second distance measurement device 730 of the second embodiment.

FIG. 7B is a diagram illustrating a configuration example of the second distance measurement device 730 of the second embodiment. The second distance measurement device 730 includes a light projection system configured with a projection optical system 731, a laser 732, and a projection control unit 733, and a light receiving system configured with a light receiving optical system 734, a detector 735, a distance measurement calculation unit 736, and an output unit 737.

The laser 732 includes a semiconductor laser diode that emits pulsed laser light. Light from the laser 732 is collected and applied by the projection optical system 731 having a scan system. The laser light is applied by mainly using a semiconductor laser, but is not particularly limited. The laser light is a kind of electromagnetic wave having favorable directivity and convergence, and a wavelength is not particularly limited. Considering safety, in one embodiment, laser light is used in an infrared wavelength bandwidth.

The laser 732 is controlled to emit laser light by the projection control unit 733. The projection control unit 733 creates, for example, a pulse signal for causing the laser 732 to emit light, and a drive signal is also input to the distance measurement calculation unit 736. The scan optical system in the projection optical system 731 repeatedly executes scanning with the laser light emitted from the laser 732 in the horizontal direction in a predetermined cycle.

The laser light reflected by an object is incident on the detector 735 via the light receiving optical system 734. The detector 735 includes a photodiode and the like, and outputs an electric signal having a voltage value corresponding to a light intensity in the reflected light.

The electric signal output from the detector 735 is input to the distance measurement calculation unit 736, and a time from the output of the drive signal output to the laser 732 from the projection control unit 733 to the generation of a light receiving signal is measured. That is, a time difference between the time at which the laser light is emitted and the time when the reflected light is received is measured, and a distance to a subject is calculated.

The calculated distance to the subject is output via the output unit 737 as the second distance information. As the scan optical system in the projection optical system, a polygon mirror, a galvano mirror, or the like may be used. In the embodiment, for example, a laser scanner having a structure in which a plurality of polygon mirrors are stacked in the vertical direction and a plurality of laser lights disposed to be arranged in the up-down direction are horizontally scanned is used. By configuring and operating the second distance measurement device as described above, it is possible to acquire a distance to an object by which an applied electromagnetic wave is reflected.

The second distance measurement device 730 measures a subject distance on the basis of an arrival time of emitted laser light reflected by a subject and detected by the detector. Thus, even if the optical characteristics of the projection optical system 731 and the light receiving optical system 734 change due to changes in temperature and humidity, vibration, or the like, the influence on the light flight time is small. That is, the second distance measurement device 730 is less influenced by changes (errors) over time in distance measurement results due to temperature and humidity changes or vibrations compared with the distance measurement device 720.

An angle of view and coordinates of the second distance information acquired by the second distance measurement device 730 are associated with an angle of view and coordinates of an image acquired by the imaging device 710 through prior calibration.

Description of Distance Measurement Device

Figure 8A:
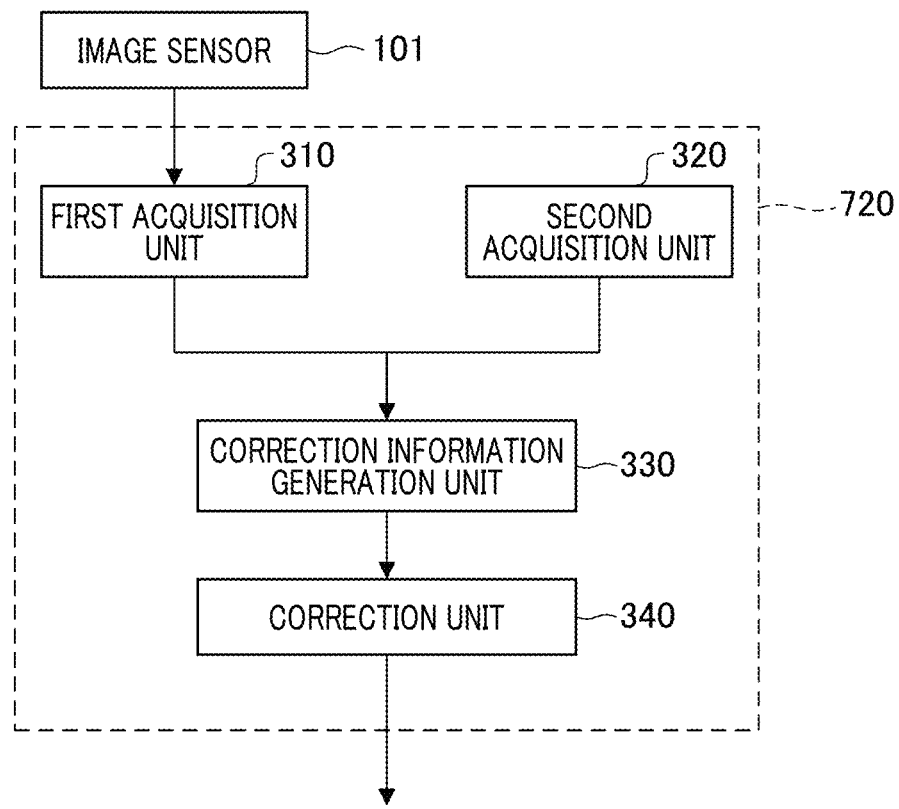
FIG. 8A is a functional block diagram illustrating an outline configuration of a distance measurement device 720 of the second embodiment.

The distance measurement device 720 of the embodiment will be described. FIG. 8A is a functional block diagram illustrating an outline configuration of the distance measurement device 720 of the embodiment. A block having the same reference numeral as in FIG. 3A has the same function.

In the distance measurement device 720, the second acquisition unit 320 acquires the second distance information Idist2 acquired by the second distance measurement device 730. That is, the second distance information is measured on the basis of the arrival time of reflected electromagnetic waves after the electromagnetic waves are applied. The correction information generation unit 330 acquires the correction value Ic from the first distance information Idist1 and the second distance information Idist2. The correction unit 340 generates and outputs the corrected distance information IdistC by correcting the first distance information Idist1 by using the correction value Ic.

Figure 8B:
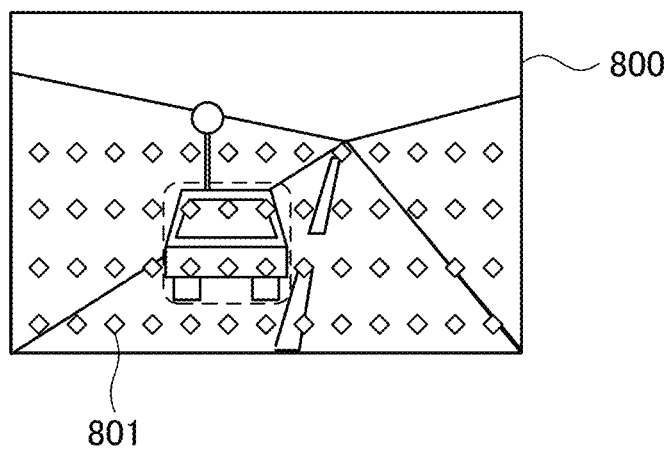
FIG. 8B is a diagram for describing second distance information Idist2 acquired by the second distance measurement device 730.

FIG. 8B is a diagram illustrating the second distance information Idist2 acquired by the second distance measurement device 730. For the sake of description, coordinates 801 from which the second distance information acquired by the second distance measurement device 730 is obtained are represented by a diamond, and are superimposed on a captured image 800 that is acquired by the imaging device 710 at the same time as when the distance information is acquired by the second distance measurement device 730. At each point of the coordinates 801, the second distance information Idist2 is acquired on the basis of the flight time of applied laser light.

In the correction information generation unit 330, a process equivalent to the correction information generation process in step S330 described above is executed by using the first distance information Idist1 and the second distance information Idist2 at the same time point to generate the correction value Ic. A process equivalent to the correction process in step S340 described above is executed to calculate the corrected distance information IdistC obtained by correcting the first distance information Idist1.

In the second embodiment, the second acquisition unit uses the second distance information Idist2 acquired by the second distance measurement device 730 based on the active distance measurement method using laser light. Therefore, an image acquired for the distance measurement may be only an image group for generating the first distance information Idist1, and thus a memory capacity can be reduced.

The second distance information acquired via the second distance measurement device described in the embodiment is measured by laser imaging detection and ranging (LiDAR) or time of flight (ToF), but is not limited to this. The second distance information may be measured by a millimeter-wave radar by using electromagnetic waves instead of laser light, or a similar active distance measurement device.

The reliability of the second distance information may be calculated based on a light reception intensity when the laser light is reflected and returned, and only distance measurement coordinates with high reliability may be used for the correction information generation process.

Third Embodiment

Determination of Whether or not Correction Process can be Executed

In a third embodiment, execution determination is executed before the start of a correction process flow. That is, it is determined on the basis of an imaged scene or the like before the execution of the correction process flow whether or not a favorable correction amount can be obtained when the correction process flow is executed. Consequently, it is possible to avoid executing the flow in advance for a scene in which a favorable correction amount cannot be obtained, and effects such as a reduction of calculation amount, a reduction of memory capacity for image data set storage, and a reduction of heat generation amount can be achieved. Also if it is determined that the correction is not necessary, the correction process flow is not executed, and the first distance information that has not been corrected is output.

Figure 9A:
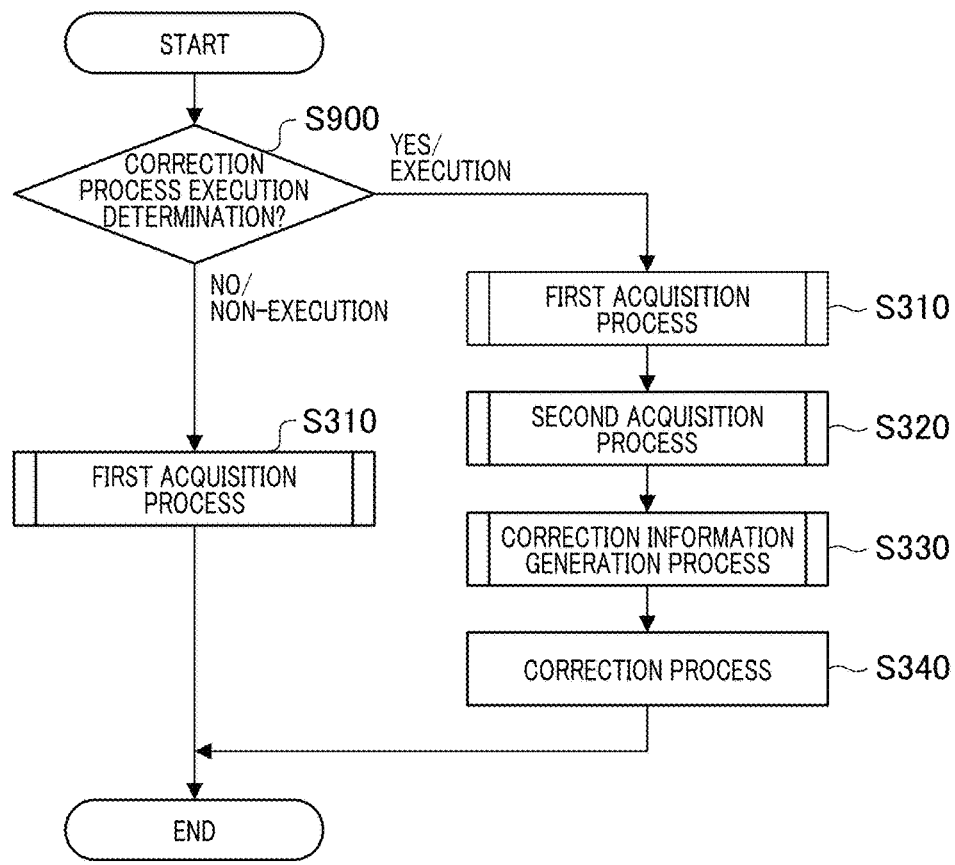
FIG. 9A is a flowchart illustrating correction process execution determination of a third embodiment.
Figure 9B:
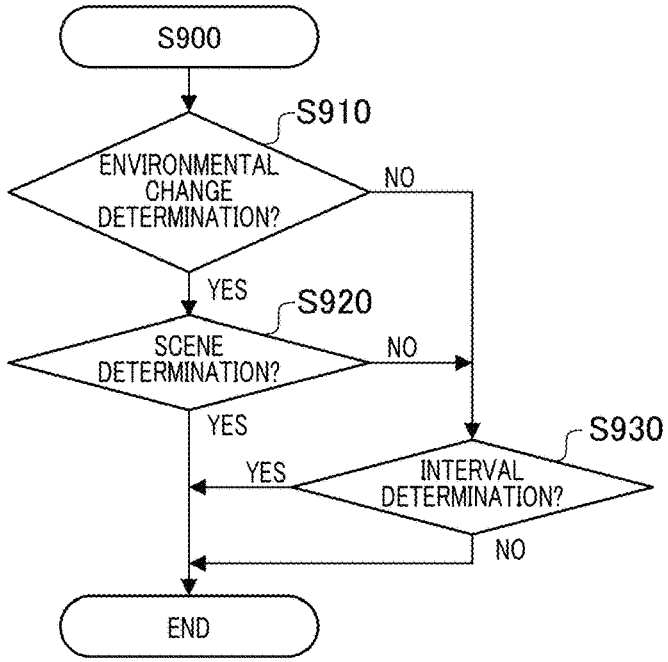
FIG. 9B is a flowchart for step S900 in FIG. 9A.

FIG. 9A is a flowchart illustrating correction process execution determination of the third embodiment, and FIG. 9B is a flowchart for step S900 in FIG. 9A. Each process in FIGS. 9A and 9B is executed by the central processing unit (CPU) of the distance measurement device 110 executing the computer program stored in the memory.

If it is determined in step S900 that the correction process flow is to be executed, the correction process described in the first embodiment is executed and the corrected distance information is output. If it is determined in step S900 that the correction process is not to be executed, the first acquisition process in step S310 described above is executed, and the obtained first distance information is output without correction.

Details of the execution determination in step S900 will be described with reference to FIG. 9B.

In environmental change determination in step S910, the determination is executed on the basis of the presence or absence of an environmental change in the surroundings of the imaging device (or distance measurement device) according to the embodiment. Specifically, temperature information and humidity information of the surrounding environment are acquired in a predetermined cycle by using a sensor, and if a value thereof or an amount of change therein exceeds a preset threshold value, execution (Yes) is determined, and if it does not exceed, non-execution (No) is determined.

On the basis of whether or not a vibration that exceeds a predetermined threshold value momentarily is applied by using an output from a vibration detection sensor such as a gyro, if there is a vibration, execution (Yes) may be determined, and if there is no vibration, non-execution (No) may be determined. Alternatively, a cumulative value of vibration may be stored, and if it is determined that the cumulative value exceeds a predetermined level, Yes may be determined, and if not, it No may be determined. As described above, the surrounding environment determined in step S910 includes at least one of weather, a season, a temperature, humidity, and vibration.

In step S920, it is determined whether or not a favorable correction amount can be acquired in a scene. That is, the suitability of the second distance information is determined. In the case of the SfM method described in the first embodiment, the second acquisition unit calculates feature points from an image of the current surrounding environment acquired by the imaging device in the same manner as in the optical flow calculation process in step S321 described above, and acquires a determination score on the basis of the calculated feature points. Specifically, a determination score S is calculated by using the following Equation 6 on the basis of the number N of the feature points in an angle of view, a distribution D of the feature points in the angle of view, and the reliability C of the calculated feature points.

$$S=\alpha*N+\beta*D+\gamma*C \qquad (6)$$

Here, α, β, and γ are coefficients and are set as appropriate.

The distribution D of the feature points in the angle of view is expressed as D=δ*σ by using the standard deviation 6 on the basis of a histogram of the coordinate values of coordinates from which the feature points are obtained. The reliability C of the feature points is calculated on the basis of the strength of a feature amount according to the method used when calculating the feature points, and a sum of the strengths of respective feature amounts of the feature points is the reliability C of the feature points. If the determination score S obtained as described above exceeds the threshold value set as appropriate, it is determined that appropriate second distance information can be obtained, and execution (Yes) is determined in the scene determination in step S920.

Alternatively, if a distance assuming device is mounted on a moving device, it may be determined from GPS data or, for example, a rotation speed of an axle or the like whether or not a movement speed of the moving device is equal to or less than a predetermined value. If a movement speed is equal to or less than the predetermined value, the optical flow based on the SfM method cannot be sufficiently obtained. Therefore, in that case, control may be performed such that the second acquisition process using the optical flow calculation process in step S321 is not executed. Alternatively, it may be determined whether or not a magnitude of the optical flow is equal to or less than a predetermined threshold value, and if the magnification is the threshold value, the second acquisition process using the optical flow calculation process in step S321 does not have to be executed.

If the second acquisition unit is an active distance measurement device using an electromagnetic wave such as laser light described in the second embodiment, the number N of measurement points within an angle of view may be evaluated by the number of points at which a reflected light intensity can be measured and distance information can be acquired, and the distribution D of the measurement points within an angle of view may be evaluated according to the same method as described above. The reliability C of the calculated measurement points is expressed by a numerical value of the magnification of a reflected light intensity at each point, but the determination score S may be similarly obtained as a sum by using Equation 6 and the execution determination may be executed by using a threshold value. As described above, the scene determination in step S920 or the determination of the suitability of the second distance information may be executed on the basis of any of the number, the distribution, and the reliability of the measurement points, a movement speed, and optical flow magnitude used in the second acquisition process.

If it is determined that the environmental change determination in step S910 or the scene determination in step S920 is not executed (No), interval determination is executed in step S930. The purpose of the interval determination in step S930 is to measure the elapsed time from the previous correction such that a time interval for executing the correction is not too long. An interval threshold value th is set as appropriate, and if an elapsed time ti from the previous correction exceeds th, it is determined that the correction is executed (Yes) in the interval determination in step S930.

The interval threshold th is set according to a surrounding environment. The surrounding environment is any of the season, the weather, traveling conditions such as a road surface, and the like. Under environmental conditions (for example, high temperature and high humidity) in which changes over time are likely to occur, the interval threshold value th may be set to a small value, and the correction process may be executed frequently. If a result of the interval determination is Yes, a probability of executing the correction may be increased by reducing the threshold value in step S910 or S920 by a predetermined ratio instead of always executing the correction.

For determination of an execution timing of the correction process, a determination timing is set in accordance with starting of the distance measurement device or the moving device. Immediately after the device is started, various electric components such as an image sensor and a board start to generate heat, and the temperature inside the device starts to rise sharply. Therefore, a time for which a warm-up operation of the device is expected to be completed may be set in advance, the correction process may be executed once after the time has elapsed, and execution determination of the correction process may be executed from the next time.

In one embodiment, an execution timing of the correction process is determined according to a movement status of the device. Assuming an in-vehicle camera, a pitch fluctuation of the vehicle body is large when traveling on a rough road, and there is a high probability that a large error may occur in the calculation of a camera posture used in the second acquisition unit. As described above, it may be determined that the correction process is not executed under a situation in which a large error is superimposed on the calculation of the correction value according to a movement status (scene) of the device.

The correction process execution determination may be executed, and if the execution determination continues to be issued at short intervals, an alert (warning) may be set. The temperature and humidity of the environment, which cause changes over time, have a relatively long time constant compared with an operation of the device. It is rare that an impact due to vibration or the like that causes a change over time frequently occurs.

Therefore, if the execution determination continues to be issued at short intervals, there is a high probability of trouble caused by other factors such as failure other than changes over time. Therefore, it is desirable to make settings that prompt repairs or maintenance by issuing alerts.

Estimation of image space change amount through division of region

Fourth Embodiment

In a correction process related to a fourth embodiment, when estimating an image space change amount from difference data between defocus amounts based on different methods, an angle of view (screen) is divided into regions to estimate and integrate image space change amounts, and thus a correction amount is calculated.

An image space change amount due to changes over time in a device configuration has a continuous and smooth shape as described above, but a shape of an image space change amount may be asymmetrical with respect to the xy plane or may include local unevenness due to the influence of design values of the optical system or the like or assembly errors.

When executing surface estimation on such an image space change amount through polynomial approximation, a shape may not be fully expressed even if higher-order terms are used.

In such a case, a difference between the actual image space change amount and the surface estimated through the approximation is a residual error. This residual error is included in the correction value Ic, and the corrected distance information IdistC that is a correction result also includes the residual error. Therefore, in the fourth embodiment, in order to be able to accurately express the image space change amount on the surface estimated through the approximation, the screen is divided into a plurality of regions, and approximation calculation is performed on the correction value for each region. A distance measurement error is reduced by combining the results of the approximation calculation for the plurality of regions.

Figure 10A:
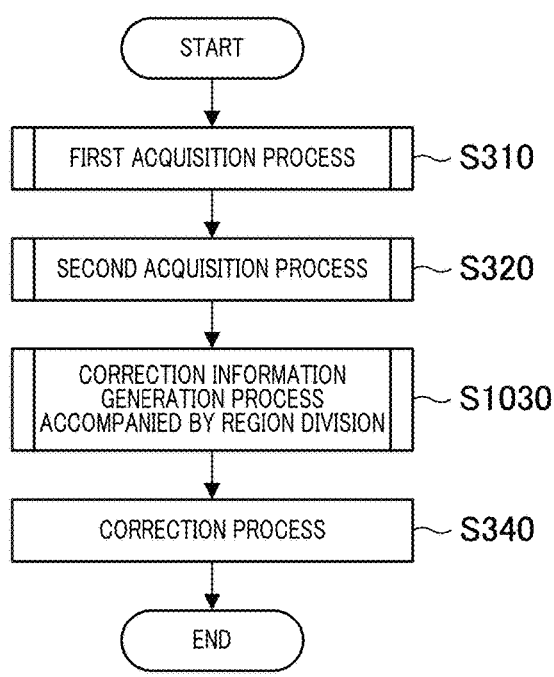
FIG. 10A is a flowchart illustrating an overall flow of executing correction value processing accompanied by region division of a fourth embodiment.
Figure 10B:
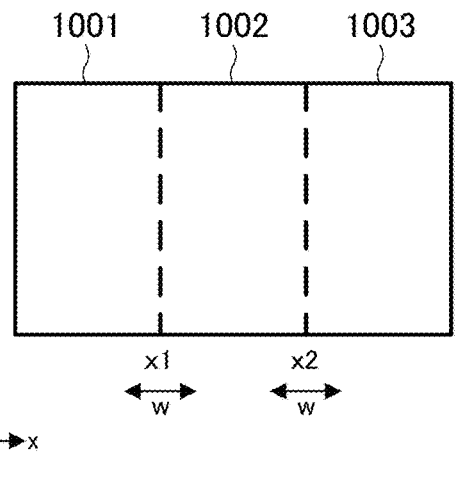
FIG. 10B is a diagram illustrating a state in which a region for calculating a defocus amount is divided.
Figure 10C:
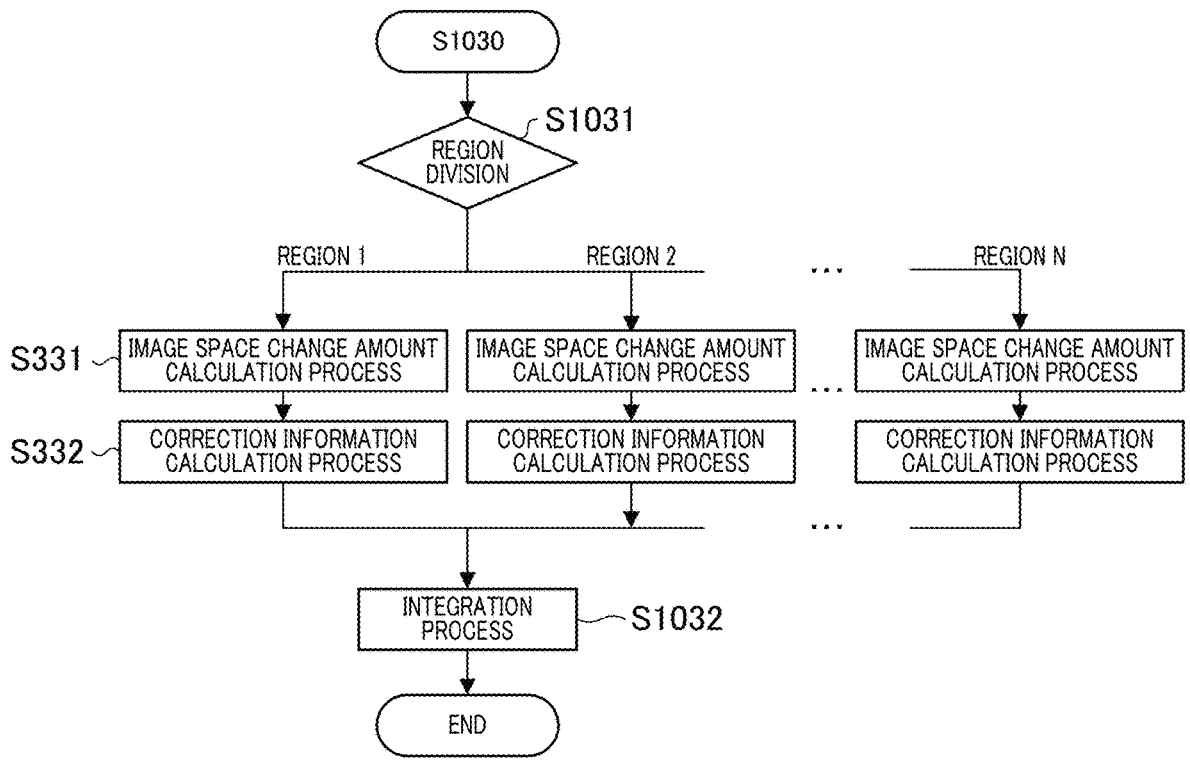
FIG. 10C is a flowchart illustrating details of step S1030.

FIG. 10A is a flowchart illustrating an overall flow of executing correction value processing accompanied by region division of the fourth embodiment, FIG. 10B is a diagram illustrating a state in which a region for calculating a defocus amount is divided, and FIG. 10C is a flowchart illustrating details of step S1030.

Each process in FIGS. 10A and 10C is executed by the central processing unit (CPU) of the distance measurement device 110 executing the computer program stored in the memory.

In the flowchart of FIG. 10A of the fourth embodiment, in the operation flow of the distance measurement device 110 illustrated in FIG. 3B, the correction information generation process in step S330 is replaced with the correction information generation process accompanied by region division in step S1030.

In the example in FIG. 10B, a screen region for calculating the defocus amount is divided into three regions, for example, in the x direction. That is, the region is divided into a region 1001 and a region 1002 with a coordinate x1 as a boundary, and further divided into a region 1003 with a coordinate x2 as a boundary. The number of division regions may be set to any value, a region shape may be any shape regardless of a division direction such as horizontal division, vertical division, both horizontal and vertical division, or division regardless of the horizontal or vertical axis, and sizes of respective regions may be different.

The first distance information Idist1 and the second distance information Idist2 are respectively acquired in the first acquisition process in step S310 and the second acquisition process in step S320, and then the flow proceeds to step S1030. In step S1030, the same process as the correction information generation process in step S330 described above is executed on each region.

Details of the correction information generation process accompanied by the region division in step S1030 will be described with reference to FIG. 10C.

The region is divided in step S1031, and the first distance information Idist1 and the second distance information Idist2 corresponding to each set region are passed to step S331 to perform an image space change amount calculation process. In the same manner as described above, the image space change amount calculation process in step S331 and the correction information calculation process in step S332 are executed on each region to calculate the correction value Ic for each region (correction information generation step).

In the integration process in step S1032, the boundary portion of the correction value Ic for each region is smoothly connected, and the correction value Ic for the entire angle of view is calculated. Specifically, as illustrated in FIG. 10B, a connecting section w is set for the boundary coordinate x1. The averaging process, that is, $Ic12=(Ic1+Ic2)/2$, is executed on the correction value Ic1 calculated for the region 1001 included in the connecting section w and the correction value Ic2 calculated for the region 1002. The same process is executed on the boundary coordinate x2, a provisional correction value Ictmp corresponding to all pixels is finally created by using the correction value Ic after the averaging process as a correction value for the correcting section w, and the correction value Ic calculated for that region in the other regions.

The provisional correction value Ictmp is not smooth because it is simply connected, and is thus smoothed by combining a scaling process and an interpolation process, which are well-known methods. As described above, the correction value Ic corresponding to the entire angle of view is calculated by calculating and integrating the correction value for each region.

By dividing a region and estimating an image space change amount, even if there are local irregularities or asymmetrical shapes in an actual image space change amount, low-order approximation is possible within each region after division, and thus the image space change amount can be expressed by polynomial approximation or various functions. As a result, the corrected value Ic after integration has a shape similar to that of the actual image space change amount, and thus a residual error can be reduced.

In step S1030 illustrated in FIG. 10C, the correction value Ic calculated by executing up to the integration process in step S1032 may be fed back to the process in step S1031 again. A loop process may be executed in which the calculated correction value Ic is set as an initial value instead of a difference value between defocus amounts of Idist1 and Idist2.

At that time, by increasing the number of region divisions N each time the loop is turned and estimating a local shape of the image space change amount from a global shape thereof, the approximation of the surface estimation can be prevented from falling to a local minimum solution or diverging. Next, the feedback loop processing will be described.

Correction Value is Fed Back and Correction Process is Looped

In the correction process related to the fourth embodiment, a process of feeding back calculated correction information and executing a correction process or a correction value calculation process again to improve the accuracy will be described.

Figure 11A:
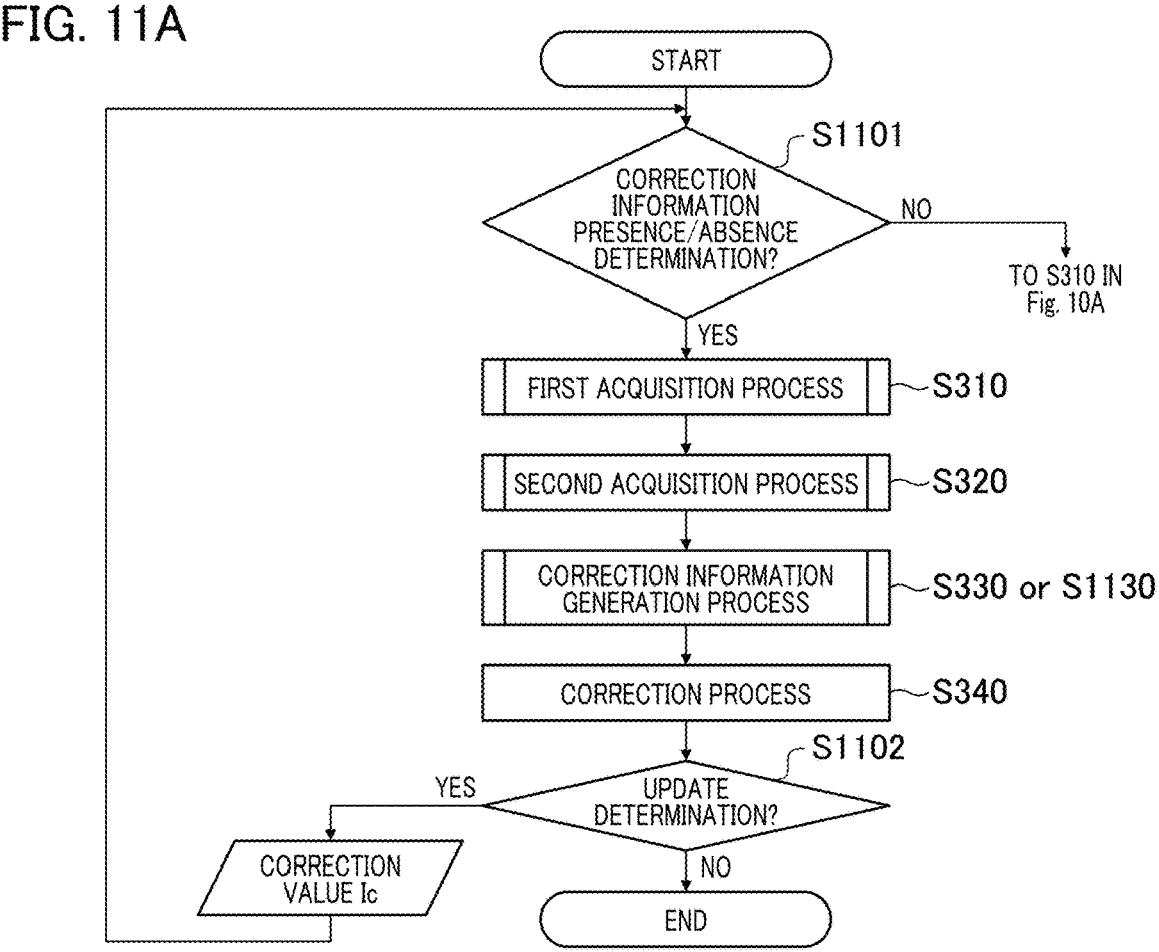
FIG. 11A is an overall flowchart in which a calculated correction value is fed back and correction is looped.
Figure 11B:
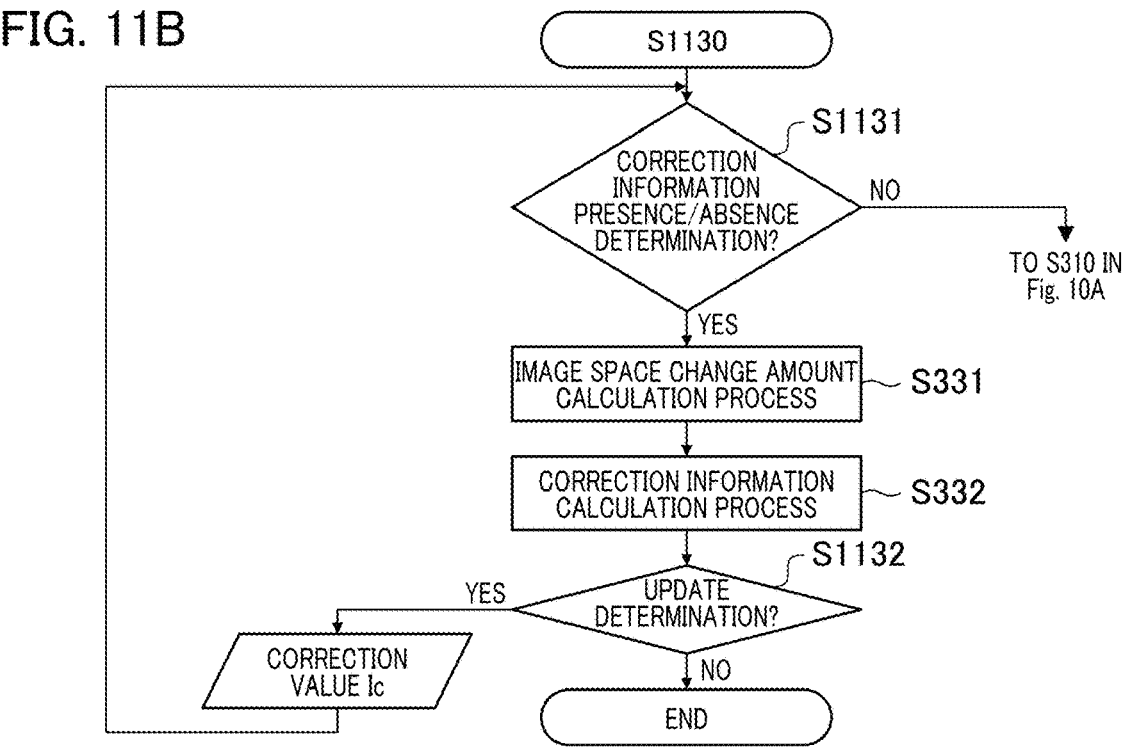
FIG. 11B is a partial flowchart of FIG. 11A.

FIG. 11A is an overall flowchart in which a calculated correction value is fed back and correction is subjected to loop processing, and FIG. 11B is a partial flowchart of FIG. 11A. Each process in FIGS. 10A and 10B is executed by the central processing unit (CPU) of the distance measurement device 110 executing the computer program stored in the memory.

It is determined whether or not there is the fed-back correction value Ic in the correction information presence/absence determination in step S1101. If there is no fed-back correction value Ic, such as when the correction process is executed for the first time, it is assumed that there is no initial data of the correction value Ic (or a dummy file having a value of 0), and the processes in steps S310 to S340 and the like in FIG. 10A are executed.

If it is determined that there is there fed-back correction value Ic in the correction information presence/absence determination in step S1101, the fed-back correction value Ic is used. The first distance information Idist1 is calculated by using the defocus amount ΔL' corrected on the basis of Equation 5 in the first acquisition unit in step S310. The process in step S320 is executed, the new correction value calculated by using the correction information in step S330 is updated as the correction value Ic, and then corrected distance information is calculated by using the updated correction value Ic in the process in step S340. In the update determination in step S1102, it is determined whether the update of the correction value Ic is insufficient.

If it is determined that the update of the correction value Ic is insufficient (Yes), the current correction value Ic is fed back, and the entire correction process flow is executed again from the process in step S1101. If it is determined in the update determination in step S1102 that the update of the correction value Ic is sufficient (No), the current corrected distance information is output.

In the update determination in step S1102, if the preset number of updates has not been reached, Yes may be determined, and if it has been reached, No may be determined.

That is, it is possible to predict an image space change amount to some extent by examining simulation in advance from design values of the device, and surrounding temperature change and humidity change. Therefore, regarding prediction, since it is possible to predict how many feedback loops a correction value will converge to the actual image space change amount, a threshold value for the number of updates may be set.

The update determination may be executed in step S1102 on the basis of the corrected distance information IdistC output in the correction process in step S340. A recognition process may be executed on an acquired image, and it may be determined whether a region classified as the same subject has the same distance value, a region recognized as a road surface has a distance distribution that can be expressed by the surface, and the like. The corrected distance information IdistC may be compared with the second distance information, and a difference value therebetween may be subjected to threshold value determination.

Alternatively, in the update determination in step S1102, the update determination may be executed on the basis of the calculated correction value Ic. The calculated correction value Ic may be compared with a difference value between the image space defocus amounts of Idist1 and Idist2 that are the original data of the surface fitting, and a correlation between the two may be subjected to threshold value determination.

The correction information generation process in step S330 in FIG. 11A may be replaced with the correction information generation process in step S1130 as illustrated in the flowchart of FIG. 11B. Step S1130 is a step in which the calculated correction value is fed back and correction value calculation is subjected to loop processing.

In FIG. 11B, the correction information presence/absence determination in step S1131 is the same as the process in step S1101 in FIG. 11A. If there is no fed-back correction value Ic, the processes in steps S310 to S340 and the like in FIG. 10A are executed, and if there is the fed-back correction value Ic, the fed-back correction value Ic is used to execute the processes in steps S331 and S332 in FIG. 11B. In the update determination in step S1132, it is determined whether the update of the correction value Ic is insufficient. In that case, specifically, the determination may be performed on the basis of an update amount of a coefficient of a polynomial function at the time of fitting.

If it is determined in step S1132 that the update of the correction value Ic is insufficient (Yes), the current correction value Ic is fed back and the correction value calculation process is executed again from the process in S1131. If it is determined in step S1132 that the update of the correction value Ic is sufficient (No), the current corrected correction value Ic is output.

Fifth Embodiment

Figure 12A:
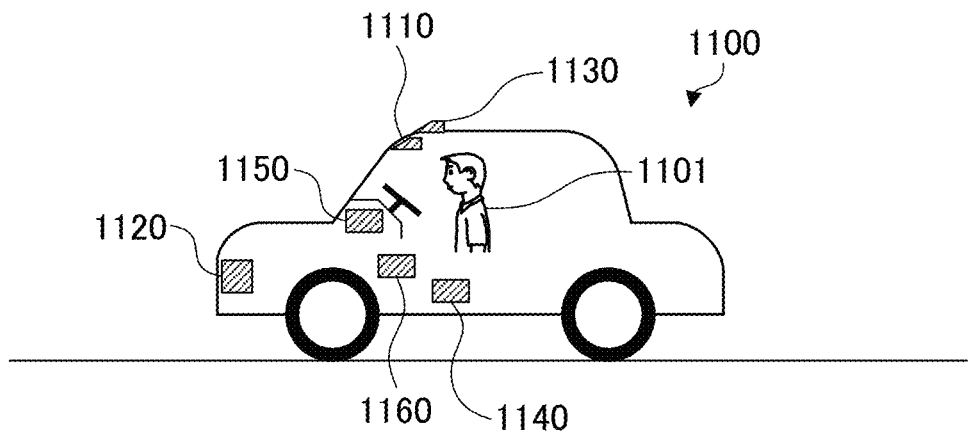
FIG. 12A is a schematic diagram illustrating an overall configuration of a moving device of a fifth embodiment.
Figure 12B:
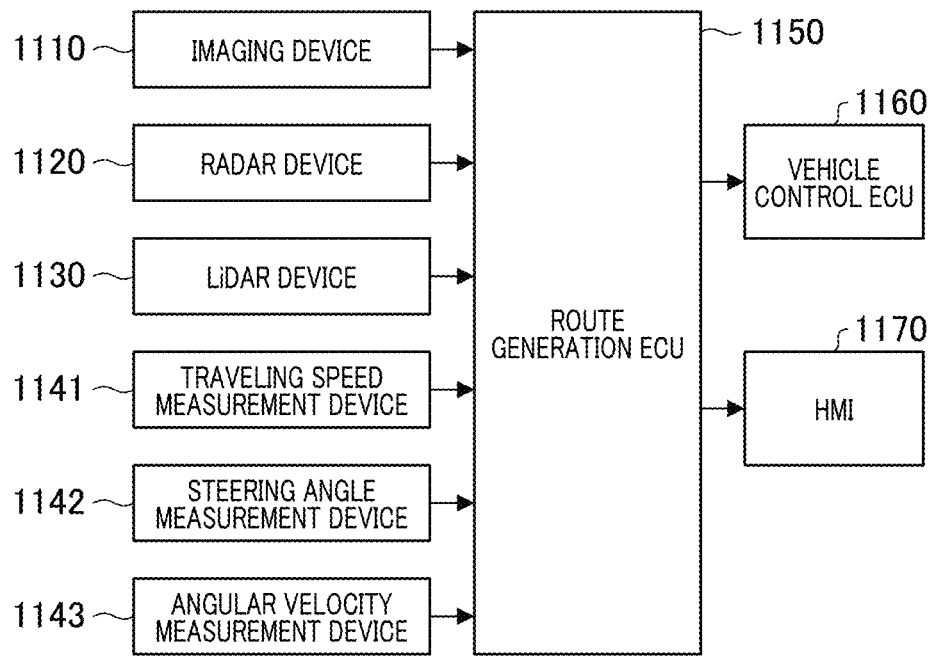
FIG. 12B is a block diagram of the fifth embodiment.

In-Vehicle Device and Vehicle Control
Basic Configuration and Overall Configuration
FIG. 12A is a schematic diagram illustrating the overall configuration of a moving device of a fifth embodiment, and FIG. 12B is a block diagram of the fifth embodiment. The moving device is not limited to an automobile, and may be, for example, a train, an airplane, a ship, a small mobility vehicle, any of various robots such as an automatic guided vehicle (AGV), or a drone.

In FIGS. 12A and 12B, a vehicle 1100 includes an imaging device 1110, a millimeter-wave radar device 1120, a LiDAR device 1130 (LiDAR: light detection and ranging), and a vehicle information measurement device 1140. The vehicle 1100 further includes a route generation ECU 1150 (ECU: electronic control unit) and a vehicle control ECU 1160. As another form of the route generation ECU 1150 and the vehicle control ECU 1160, they may be configured with a central processing unit (CPU) as a computer, a memory storing an arithmetic processing program, and the like.

The imaging device 1110 has the first acquisition unit 310, the second acquisition unit 320, the correction information generation unit 330, the correction unit 340, and the like that perform the same operation as described in First to the fourth embodiments. A control unit such as the route generation ECU 1150 or the vehicle control ECU 1160 has a control step of controlling a warning or a movement operation (a direction, a movement speed, and the like) of the vehicle 1100 as a moving device on the basis of the first distance information corrected by the correction unit.

The imaging device 1110 images the surrounding environment including a traveling road of the vehicle 1100, generates image information indicating the captured image, and distance image information having information indicating a distance to a subject for each pixel, and outputs the information to the route generation ECU 1150. As illustrated in FIG. 12A, the imaging device 1110 is disposed near the upper end of a windshield of the vehicle 1100, and images a region in a predetermined angle range (hereinafter referred to as an imaging angle of view) toward the front in the vehicle 1100.

The information indicating the distance to the subject may be any information that can be converted into a distance from the imaging device 1110 to the subject within the imaging angle of view, and may be information that can be converted by using a predetermined reference table or a predetermined conversion coefficient and conversion formula. For example, a distance value may be assigned to a predetermined integer value and output to the route generation ECU 1150. Information that can be converted into a distance to the subject and can be converted into an optically conjugate distance value (a distance from the image sensor to the conjugate point (so-called defocus amount) or a distance from the optical system to the conjugate point (from the principal point on the image space to the conjugate point)) may be output to the route generation ECU 1150.

As the vehicle information measurement device 1140, the vehicle 1100 includes a traveling speed measurement device 1141, a steering angle measurement device 1142, and an angular velocity measurement device 1143. The traveling speed measurement device 1141 is a measurement device that detects a traveling speed of the vehicle 1100. The steering angle measurement device 1142 is a measurement device that detects a steering angle of the vehicle 1100. The angular velocity measurement device 1143 is a measurement device that detects an angular velocity of the vehicle 1100 in a turning direction.

The route generation ECU 1150 is configured by using a logic circuit. The route generation ECU 1150 receives measurement signals from the vehicle information measurement device included in the vehicle 1100, image information and distance image information from the imaging device 1110, distance information from the radar device 1120, and distance information from the LiDAR device 1130. On the basis of such information, target route information regarding at least one of a target travel trajectory and a target travel speed of the vehicle 1100 is generated and sequentially output to the vehicle control ECU 1160.

If the vehicle 1100 is provided with an HMI 1170 (HMI: human machine interface) that displays an image or executes a voice notification or warning to a driver 1101, the driver 1101 may be notified of the target route information generated by the route generation ECU 1150 or warned via the HMI 1170.

By applying the distance correction related to the embodiment to the imaging device 1110, the accuracy of the output distance information is improved, the accuracy of the target route information output from the route generation ECU 1150 is improved, and safer vehicle driving control is achieved.

The second acquisition unit according to the embodiment may use an SfM method using the vehicle information measurement device 1140 and the imaging device 1110 regardless of whether the SfM method based on an image obtained from the imaging device 1110, the radar device 1120, or the LiDAR device 1130 is used.

While the disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions. In addition, as a part or the whole of the control according to this embodiment, a computer program realizing the function of the embodiment described above may be supplied to the distance measurement device or the like through a network or various storage media. Then, a computer (or a CPU, an MPU, or the like) of the distance measurement device or the like may be configured to read and execute the program. In such a case, the program and the storage medium storing the program configure the aspect of the embodiments.

This application claims the benefit of Japanese Patent Application No. 2021-057085 filed on Mar. 30, 2021, which is hereby incorporated by reference herein in its entirety.

What is claimed is:

1. A device comprising:
   at least one processor; and
   a memory coupled to the at least one processor storing instructions that, when executed by the at least one processor, cause the at least one processor to function as:
   a first acquisition unit configured to acquire first distance information including an error via an optical system;
   a second acquisition unit configured to acquire second distance information of which the error is less than that of the first distance information;
   a generation unit configured to calculate a correction value for correcting first defocus amounts based on the difference between the first defocus amounts and second defocus amounts, wherein the first defocus amounts are used to obtain the first distance information and corresponds to the deviation in the optical axis direction between the sensor surface and the imaging surface, and the second defocus amounts are obtained from the second distance information; and
   a correction unit configured to correct the first distance information using a corrected first defocus amounts using the correction value.

2. The device according to claim 1, wherein
the first acquisition unit acquires the first distance information on the basis of a plurality of signals having parallax output from an image sensor.

3. The device according to claim 2, wherein
the correction information generation unit calculates the correction value by using an initial value for correction related to the image formation optical system or the image sensor.

4. The device according to claim 3, wherein
the correction information generation unit acquires the initial value for the correction from a look-up table.

5. The device according to claim 3, wherein
the initial value includes an image space change amount based on an environmental temperature.

6. The device according to claim 2, wherein
the second acquisition unit acquires the second distance information on the basis of image signals for a plurality of frames from the image sensor.

7. The first acquisition unit according to claim 1, wherein
the first acquisition unit acquires the first distance information on the basis of a plurality of signals having parallax output from light fluxes that have passed through different pupil regions of a monocular optical system.

8. The device according to claim 7, wherein
the first acquisition unit acquires the first distance information on the basis of a plurality of signals having parallax output from one image sensor.

9. The device according to claim 1, wherein
the second acquisition unit acquires the second distance information by calculating an optical flow of target feature points from a plurality of images.

10. The device according to claim 9, wherein
the second acquisition unit acquires the second distance information by using SfM.

11. The device according to claim 1, wherein
the error includes an error over time in an amount of curvature of field.

12. The device according to claim 1, wherein
the correction unit determines at least one of a surrounding environment, a predetermined elapsed time, and suitability of the second distance information, and controls whether or not to correct the error of the first distance information based on the second distance information.

13. The device according to claim 12, wherein
the surrounding environment includes at least one of weather, a season, a temperature, humidity, and vibration.

14. The device according to claim 12, wherein
the suitability of the second distance information is determined on the basis of any one of the number, a distribution, and reliability of measurement points, a movement speed, and a magnitude of an optical flow used in the second acquisition unit.

15. The device according to claim 1, wherein
the correction information generation unit calculates the correction value on the basis of a difference between the first distance information and the second distance information.

16. The device according to claim 15, wherein
the correction information generation unit executes approximation calculation of the correction value for each of a plurality of regions in a screen and combines results of the approximation calculation of the plurality of regions.

17. The device according to claim 15, wherein
the correction information generation unit feeds back the correction value and executes loop processing on the correction value.

18. A moving device comprising:
a device mounted on the moving device, wherein
the device includes at least one processor and a memory coupled to the at least one processor storing instructions that, when executed by the at least one processor, cause the at least one processor to function as:
a first acquisition unit configured to acquire first distance information including an error via an image formation optical system;
a second acquisition unit configured to acquire second distance information of which the error is less than that of the first distance information;
a correction information generation unit configured to calculate a correction value for correcting first defocus amounts based on the difference between the first defocus amounts and second defocus amounts, wherein the first defocus amounts are used to obtain the first distance information and corresponds to the deviation in the optical axis direction between the sensor surface and the imaging surface, and the second defocus amounts are obtained from the second distance information; and
a correction unit configured to correct the first distance information by using the correction value, and
the moving device further comprises at least one processor or circuit configured to function as:
a control unit configured to control a warning or a movement operation of the moving device on the basis of the first distance information corrected by the correction unit.

19. A method comprising:
acquiring first distance information including an error via an image formation optical system;
acquiring second distance information of which the error is less than that of the first distance information;
calculating a correction value for correcting first defocus amounts based on the difference between the first defocus amounts and second defocus amounts, wherein the first defocus amounts are used to obtain the first distance information and corresponds to the deviation in the optical axis direction between the sensor surface and the imaging surface, and the second defocus amounts are obtained from the second distance information; and
correcting the first distance information by using the correction value.

20. A control method for a moving device comprising:
acquiring first distance information including an error via an image formation optical system;
acquiring second distance information of which the error is less than that of the first distance information;
calculating a correction value for correcting first defocus amounts based on the difference between the first defocus amounts and second defocus amounts, wherein the first defocus amounts are used to obtain the first distance information and corresponds to the deviation in the optical axis direction between the sensor surface and the imaging surface, and the second defocus amounts are obtained from the second distance information;
correcting the first distance information by using a corrected first defocus amounts using the correction value; and
controlling a warning or a movement operation of the moving device on the basis of the first distance information corrected in the correcting.

21. A non-transitory computer-readable storage medium configured to store a computer program to control a device, wherein the computer program comprises instructions for executing a method, the method comprising:
acquiring first distance information including an error via an image formation optical system;
acquiring second distance information of which the error is less than that of the first distance information;
calculating a correction value for correcting first defocus amounts based on the difference between the first defocus amounts and second defocus amounts, wherein the first defocus amounts are used to obtain the first distance information and corresponds to the deviation in the optical axis direction between the sensor surface and the imaging surface, and the second defocus amounts are obtained from the second distance information; and
correcting the first distance information using a corrected first defocus amounts using the correction value.

* * * * *